All Claims, 2 Drawing Figures# United States Patent [19]

Morman

[11] Patent Number: 4,657,802
[45] Date of Patent: Apr. 14, 1987

[54] COMPOSITE NONWOVEN ELASTIC WEB

[75] Inventor: Michael T. Morman, Alpharetta, Ga.

[73] Assignee: Kimberly-Clark Corporation, Neenah, Wis.

[21] Appl. No.: 760,449

[22] Filed: Jul. 30, 1985

[51] Int. Cl.⁴ .............................................. B32B 31/00
[52] U.S. Cl. .................................. 428/152; 156/163; 156/164; 428/137; 428/161; 428/166; 428/138; 428/284; 428/226; 428/287; 428/296; 428/298; 428/299; 428/903; 428/913; 604/358; 604/365
[58] Field of Search ............... 156/163, 164; 418/152, 418/161, 166, 137, 138, 296, 284, 286, 287, 298, 299, 903, 913; 604/358, 365

[56] References Cited

U.S. PATENT DOCUMENTS

| | | | |
|---|---|---|---|
| 1,544,312 | 6/1925 | Gray | 156/164 |
| 1,911,227 | 5/1933 | Galligan | 156/164 |
| 2,022,852 | 5/1931 | Galligan | 156/164 |
| 2,030,746 | 2/1936 | Galligan | 156/163 |
| 2,957,512 | 10/1960 | Wade et al. | 156/164 |
| 3,316,136 | 4/1967 | Pufahl | 156/164 |
| 3,468,748 | 9/1969 | Bassett | 428/284 |
| 3,485,706 | 12/1969 | Evans | 161/109 |
| 3,673,026 | 6/1972 | Brown | 156/181 |
| 3,676,242 | 7/1972 | Prentice | 428/903 |
| 3,687,797 | 8/1972 | Wideman | 156/197 |
| 3,842,832 | 10/1974 | Wideman | 128/169 |
| 3,849,241 | 11/1974 | Butin | 156/167 |
| 4,104,170 | 8/1978 | Nedza | 210/487 |
| 4,209,563 | 6/1980 | Sisson | 428/288 |
| 4,296,163 | 10/1981 | Emi | 428/212 |
| 4,305,990 | 12/1981 | Kelly | 428/220 |
| 4,323,534 | 4/1982 | DesMarais | 264/176 R |
| 4,340,563 | 7/1982 | Appel | 264/518 |
| 4,355,425 | 10/1982 | Jones | 2/402 |
| 4,379,192 | 4/1983 | Wahlquist | 428/156 |
| 4,413,623 | 11/1983 | Pieniak | 428/198 |
| 4,418,123 | 11/1983 | Bunnelle et al. | 156/164 |
| 4,426,420 | 1/1984 | Likhyani | 428/224 |
| 4,446,189 | 5/1984 | Romanek | 428/152 |
| 4,450,026 | 5/1984 | Pieniak | 156/164 |
| 4,486,192 | 12/1984 | Sigl | 604/366 |
| 4,525,407 | 6/1985 | Ness | 428/152 |
| 4,573,991 | 3/1986 | Pieniak et al. | 604/366 |
| 4,606,964 | 8/1986 | Wideman | 156/163 |

FOREIGN PATENT DOCUMENTS 2260716 5/1974 Fed. Rep. of Germany .
47-43150 10/1972 Japan ............................... 156/229

OTHER PUBLICATIONS

Shell Technical Bulletin, Kraton DX 1117.
Shell Technical Bulletin, Kraton GX 1657.
Shell Technical Bulletin, Kraton D 1116.
Shell Technical Bulletin, Kraton DX 1112.
Shell Technical Bulletin, Kraton D 1111.
Shell Technical Bulletin, Kraton, Processing & Fabricating Kraton Thermoplastic Rubber Compounds.
Shell Technical Bulletin, Kraton G 1650.
Shell Technical Bulletin, Kraton D 1101.
Shell Technical Bulletin, Typical Properties of Kraton Materials 1985.
Shell Technical Bulletin, Kraton G 1652.

Primary Examiner—James J. Bell
Attorney, Agent, or Firm—Joseph P. Harps

[57] ABSTRACT

A process for producing a composite nonwoven elastic web including a nonwoven elastic web joined to a fibrous nonwoven gathered web is disclosed. The process includes the steps of (a) providing a nonwoven elastic web having a relaxed unbiased length and a stretched, biased length; (b) stretching the nonwoven elastic web to its stretched, biased length; (c) forming a fibrous nonwoven gatherable web directly upon a surface of the nonwoven elastic web while maintaining the nonwoven elastic web at its stretched, biased length; (d) forming a composite nonwoven elastic web by joining the fibrous nonwoven gatherable web to the nonwoven elastic web while continuing to maintain the nonwoven elastic web at its stretched length; and (e) relaxing the nonwoven elastic web to its relaxed length to gather the fibrous nonwoven gatherable web. In some embodiments, joining of the fibrous nonwoven gatherable web to the nonwoven elastic web occurs simultaneously with formation of the gatherable web on the surface of the elastic web. The composite elastic web formed by the disclosed process is also disclosed and described.

46 Claims, 2 Drawing Figures

COMPOSITE NONWOVEN ELASTIC WEB

FIELD OF THE INVENTION

The field of the present invention encompasses processes for forming composite nonwoven elastic webs and the composite nonwoven elastic webs formed by such processes. In particular, the field of the present invention encompasses a composite nonwoven elastic web which includes a nonwoven elastic web which is joined to a nonwoven gathered web and processes for forming such composite nonwoven elastic webs.

BACKGROUND OF THE INVENTION

There has been a desire in the area of diaper fabrication to provide an outer cover for a diaper which is (1) totally elastic over its entire surface—to provide a tight yet comfortable fit; (2) water repellent—to retain fluid materials within the confines of the diaper; (3) breathable—to allow an exchange of vapors through the diaper material; (4) soft—for improved comfort and (5) inexpensive to manufacture—so that the diaper may be economically marketed to the consumer.

Unfortunately, the known composite nonwoven materials which have, to date, been marketed have been lacking in one or more of these characteristics. Furthermore, these composite elastic nonwoven materials have not been formed by utilization of the novel and economical processes of the present invention.

For example, U.S. Pat. No. 2,957,512 to Wade discloses a method for producing an elastic composite sheet material in which a creped or corrugated flexible sheet material is bonded to, for example, an elastic meltblown material. It is stated at column 4, lines 60–65 of the patent that in formation of the structures illustrated in FIGS. 2–6 the elastomeric material is maintained in a relaxed condition during the bonding. At column 5, lines 39–48, it is stated that a fibrous web of elastomeric material may be stretched and bonded to the corrugated web at spaced points or areas and, upon allowing the fibrous elastomeric web to relax, the composite will assume the structure illustrated in FIG. 7.

Yet another method for forming a composite elastic fabric is disclosed in U.S. Pat. No. 3,316,136 to Pufahl. The preferred method of fabrication of this fabric involves the utilization of an adhesive which is first applied in a predetermined pattern to an elastic backing material and the elastic backing material is then stretched to an elongated state. While the elastic material is in the stretched, elongated state an overlying fabric is placed in contact therewith and held in pressurized engagement with the elastic material for a time period sufficient to insure adhesion of the two layers. Thereafter, upon drying of the applied adhesive, the tension on the elastic backing material is released causing the overlying fabric to gather in the areas outlined by the adhesive.

U.S. Pat. No. 3,485,706 to Evans at example 56 discloses the fabrication of an elongatable nonwoven, multilevel patterned structure having elasticity in one direction from an initially layered material. The structure is composed of two webs of polyester staple fibers which have a web of spandex yarn located therebetween. The webs are joined to each other by application of hydraulic jets of water which entangle the fibers of one web with the fibers of an adjacent web. During the entanglement step the spandex yarn is stretched 200 percent.

U.S. Pat. No. 3,673,026 to Brown discloses a method for manufacturing a laminated fabric and specifically discloses a method for manufacturing a nonwoven laminated fabric of controlled bulk. In this method separate webs of nonwoven material, e.g. creped tissue or bonded synthetic fiber, are elastically stretched to different degrees of elongation and laminated by bonding to one another while in their differentially stretched states. The bonded webs are thereafter relaxed so as to produce different degrees of contraction in each web with resultant separation of the webs in the unbonded regions and controlled bulk in the laminate. It is stated that the differential stretching includes the situation where only one web is actually stretched and the other web is maintained slack or nearly so.

U.S. Pat. No. 3,687,797 to Wideman discloses a method for producing a resilent cellulosic wadding product obtained by laminating a lower cellulosic wadding web to a prestretched polyurethane foam web. The process involves applying adhesive in a desired pattern to either of the webs with the wadding web then being laminated to the prestretched polyurethane foam web. During lamination of the wadding web to the polyurethane foam web the foam web is maintained in a stretched condition. After lamination of the two webs, the tension on the prestretched polyurethane foam web is released to cause a contraction of the foam web. The adhesive retains the wadding product and foam together while permitting bulking in areas between the adhesive zones. The stresses still remaining in the product after contraction may be further relieved by wetting.

U.S. Pat. No. 3,842,832 to Wideman is directed to a disposable stretch product such as a bandage and a method for production of the product. The product is manufactured by passing a longitudinally oriented nonwoven material over a roller so as to apply an adhesive to one surface of the nonwoven material. At the same time a polyurethane web is heated and longitudinally stretched and adhered to the nonwoven material. Thereafter, a second nonwoven material is adhered to the other surface of the polyurethane web to form a laminate consisting of a stretched inner polyurethane core and outer unstretched nonwoven fabric layers adhered to the core by the adhesive. Next, the laminate is passed through a moistening device which results in a relaxing of the engagement between the nonwoven fabric outer layers and the adhesive connecting the outer layers to the stretched polyurethane core layer. This allows the stretched polyurethane layer to return to substantially its original length which results in the outer nonwoven layers being buckled or undulated to form wrinkles.

U.S. Pat. No. 4,104,170 to Nedza discloses a liquid filter having an improved extended polypropylene element. Fabrication of the polypropylene element is accomplished by forming a spunbonded underlayer of a continuous polypropylene fiber which adheres to itself as it is laid down in a random pattern. Thereafter, an overlayer of short polypropylene fibers is deposited onto the underlayer by, for example, meltblowing the overlayer onto an extended sheet of the underlayer.

A method for producing an elastic cloth structure which includes fibers of a synthetic, organic, relatively elastomeric polymer and fibers of a synthetic, organic, elongatable, but relatively nonelastic polymer is disclosed in U.S. Pat. No. 4,209,563 to Sisson. The method includes the steps of forwarding the relatively elastic fibers and elongatable but relatively non-elastic fibers for a well dispersed random lay-down on a porous forming surface of an unbonded web having random fiber crossings. Thereafter, at least some of the fiber crossings are bonded to form a coherent bonded cloth web which is stretched to elongate some of the fibers in at least one direction and then released so that retraction of the web by the relatively elastomeric fibers provides for looping and bunching of the elongatable relatively nonelastic fibers. Forwarding of the fibers to the porous forming surface is positively controlled, and this positive control is contrasted at column 7, lines 19–33 of the patent to the use of air streams to convey the fibers. It is also stated at column 9, line 44 et. seq. of the patent that bonding of the filaments to form the coherent cloth may utilize embossing patterns or smooth heated roll nips.

U.S. Pat. No. 4,296,163 to Emi et al. discloses a fibrous composite having a coalcesed assembly of (A) a sheet-like mesh structure composed of fibers of a synthetic elastomeric polymer, the individual fibers of which are interconnected at random in irregular relationship to form a number of meshes of different sizes and shape with the mesh structure having a recovery ratio after 10% stretch of at least 70% in two arbitrarily selected, mutually perpendicular directions on the plane of the mesh structure, and (B) a mat-, web- or sheet-like fiber structure composed of short or long fibers, with the fiber structure having a recovery ratio after 10% stretch of less than 50% in at least one arbitrarily selected direction. It is stated that the elastic composite is suitable as various apparel based materials and industrial materials such as filter cloths, absorbents, and heat insulating materials. Methods for forming the composite are described at column 6, line 64 et. seq. and these methods include spun bonding, see column 9, lines 15–41.

U.S. Pat. No. 4,323,534 to DesMarais discloses an extrusion process for a thermoplastic resin composition for fabric fibers with exceptional strength and good elasticity. At column 8 under the subtitle "Fiber-Forming" meltblowing of a compounded resin comprising 79.13% KRATON G-1652, 19.78% stearic acid, 0.98% titanium dioxide and 0.1% Irganox 1010 antioxidant is disclosed. It is stated that individual fibers were extruded from the meltblowing die.

U.S. Pat. No. 4,355,425 to Jones discloses a panty with a built-in elastic system to minimize gathering and to provide a comfortable, conforming fit and a method for assembling the panty. It is stated that a material made of meltblown KRATON rubber is well suited for the panty fabric material. It is also stated that a process for making meltblown KRATON fabrics is disclosed and shown schematically in FIG. 8 of the patent. The process which appears to utilize KRATON G-1652 is discussed starting at column 4, line 67 of the patent.

U.S. Pat. No. 4,379,192 to Wahlquist discloses a method for forming an impervious absorbent barrier fabric embodying film and fibrous webs where one or more meltblowing dies meltblow discontinuous fibers of small diameter as a mat directly on a prebonded web of continuous filaments. At column 3, lines 35–40 of the patent it is stated that by forming the microfiber mat directly onto the prebonded continuous filament web, primary bonds are created between the microfibers and the continuous filaments which attach the microfiber mat to the continuous filament web.

U.S. Pat. No. 4,426,420 to Likhyani discloses hydraulically entangled spunlaced fabrics composed of at least two types of staple fibers and processes for their formation which include heat treating elastomeric fibers, which behave as ordinary staple fibers until they are heat treated, to impart improved stretch and resilience properties to the fabric. The method includes the steps of drawing a potentially elastomeric fiber and allowing it to relax between the drawing and wind-up steps.

U.S. Pat. No. 4,446,189 to Romanek discloses a nonwoven textile fabric laminate which includes at least one layer of nonwoven textile fabric which is secured by needle punching to an elastic layer so that the nonwoven layer of textile fabric will be permanently stretched when the elastic layer is drafted within its elastic limits. When the elastic layer is allowed to relax and return to substantially its condition prior to being drafted the nonwoven fabric layer is stated to exhibit increased bulk as a result of its concurrent relaxation. It is also stated that the nonwoven textile fabric laminate may be utilized to form wearing apparel which has enhanced freedom of movement.

The abstract of Japanese document No. 47-43150 discloses a method for producing a nonwoven fabric having high tenacity with the method being carried out by (a) monoaxially stretching a sheet or film made of a mixture of incompatible polymers, (b) laminating this sheet or material with a layer of foamed polymer, (c) stretching the laminate at right angles to the direction of orientation of the substrate and then (d) stretching in the direction orientation of the substrate. Preferred polymers are stated to include polyamides, linear polyesters, and polyolefins. Preferably, the upper layer is a polypropylene foam.

A Shell Chemical Company brochure entitled "KRATON Thermoplastic Rubber" generally discusses thermoplastic KRATON materials. This brochure is code designated by "SC: 198-83 printed in U.S.A. 7/83 SM".

While the above-discussed documents may disclose products and processes which exhibit some of the characteristics or method steps of the present invention none of them discloses or implies the presently claimed processes or the products resulting from these processes.

DEFINITIONS

The terms "elastic" and "elastomeric" are used interchangeably herein to mean any material which, upon application of a biasing force, is stretchable to a stretched, biased length which is at least about 125 percent, that is about one and one quarter, of its relaxed, unbiased length, and which will recover at least about 40 percent of its elongation upon release of the stretching, elongating force. A hypothetical example which would satisfy this definition of an elastomeric material would be a one (1) inch sample of a material which is elongatable to at least 1.25 inches and which, upon being elongated to 1.25 inches and released will recover to a length of not more than 1.15 inches. Many elastic materials may be stretched by much more than 25 percent of their relaxed length and many of these will recover to substantially their original relaxed length upon release of the stretching, elongating force and this latter class of materials is generally preferred for purposes of the present invention.

As used herein the term "recover" refers to a contraction of a stretched material upon termination of a biasing force following stretching of the material by application of the biasing force. For example, if a material having a relaxed, unbiased length of one (1) inch was elongated 50 percent by stretching to a length of one and one half (1.5) inches the material would have a stretched length that is 150 percent of its relaxed length. If this exemplary stretched material contracted, that is recovered, to a length of one and one tenth (1.1) inches, after release of the biasing and stretching force, the material would have recovered 80 percent (0.4 inch) of its elongation.

As used herein the terms "nonelastic" or "nonelastomeric" refer to and include any material which is not encompassed by the terms "elastic" or "elastomeric."

As used herein the term "meltblown microfibers" refers to small diameter fibers having an average diameter not greater than about 100 microns, preferably having a diameter of from about 0.5 microns to about 50 microns, more preferably having an average diameter of from about 4 microns to about 40 microns and which are made by extruding a molten thermoplastic material through a plurality of fine, usually circular, die capillaries as molten threads or filaments into a high velocity gas (e.g. air) stream which attenuates the filaments of molten thermoplastic material to reduce their diameter to the range stated above. Thereafter, the meltblown microfibers are carried by the high velocity gas stream and are deposited on a collecting surface to form a web of randomly disbursed meltblown microfibers. Such a process is disclosed, for example, in U.S. Pat. No. 3,849,241 to Butin and the disclosure of this patent is hereby incorporated by reference.

As used herein the term "spunbonded microfibers" refers to small diameter fibers having a diameter not greater than about 100 microns, preferably having a diameter of from about 10 microns to about 50 microns, more preferably having a diameter of from about 12 microns to about 30 microns and which are made by extruding a molten thermoplastic material as filaments through a plurality of fine, usually circular, capillaries of a spinnerette with the diameter of the extruded filaments then being rapidly reduced as by, for example, eductive drawing or other well known spunbonding mechanisms. The production of spunbonded nonwoven webs is illustrated in U.S. Pat. No. 4,340,563 to Appel and the disclosure of this patent is hereby incorporated by reference.

As used herein the term "nonwoven web" includes any web of material which has been formed without use of textile weaving processes which produce a structure of individual fibers which are interwoven in an identifiable repeating manner. Specific examples of nonwoven webs would include, without limitation, a meltblown nonwoven web, a spunbonded nonwoven web, an apertured film, a microporous web or a carded web of staple fibers. These nonwoven webs have an average basis weight of not more than about 300 grams per square meter. Preferably, the nonwoven webs have an average basis weight of from about 5 grams per square meter to about 100 grams per square meter. More preferably, the nonwoven webs have an average basis weight of from about 10 grams per square meter to about 75 grams per square meter.

As used herein the term "consisting essentially of" does not exclude the presence of additional materials which do not significantly affect the elastomeric properties and characteristics of a given composition. Exemplary materials of this sort would include, pigments, anti-oxidants, stabilizers, surfactants, waxes, flow promoters, solid solvents, particulates and materials added to enhance processability of the composition.

As used herein the term "styrenic moiety" means a monomeric unit represented by the formula:

Unless specifically set forth and defined or otherwise limited, the terms "polymer" or "polymer resin" as used herein generally include, but are not limited to, homopolymers, copolymers, such as, for example, block, graft, random and alternating copolymers, terpolymers, etc. and blends and modifications thereof. Furthermore, unless otherwise specifically limited, the terms "polymer" or "polymer resin" shall include all possible geometrical configurations of the material. These configurations include, but are not limited to, isotactic, syndiotactic and random symmetries.

OBJECTS OF THE INVENTION

Accordingly, it is a general object of the present invention to provide a new process for forming a composite nonwoven elastic web which is composed of a nonwoven elastic web having a fibrous nonwoven gathered web joined thereto.

Another general object of the present invention is to provide a new process for forming a composite nonwoven elastic web which includes a nonwoven elastic web joined to a fibrous nonwoven gathered web where the fibrous nonwoven gathered web has been gathered as a result of the fibrous nonwoven gathered web having been directly formed, in a gatherable condition, on a surface of the nonwoven elastic web while the nonwoven elastic web is maintained in a stretched, biased condition and, thereafter, relaxing the nonwoven elastic web from its stretched, biased condition or length to a relaxed, unbiased condition or length.

Yet another object of the present invention is to provide a composite nonwoven elastic web which includes a nonwoven elastic web joined to a fibrous nonwoven gathered web where the fibrous nonwoven gathered web is formed, in a gatherable condition, on a surface of the nonwoven elastic web and simultaneously joined thereto.

A further object of the present invention is to provide the composite nonwoven elastic webs formed by the processes of the present invention.

Still further objects and the broad scope of applicability of the present invention will become apparent to those of skill in the art from the details given hereinafter. However, it should be understood that the detailed description of the presently preferred embodiments of the present invention is given only by way of illustration because various changes and modifications well within the spirit and scope of the invention will become apparent to those of skill in the art in view of this detailed description.

SUMMARY OF THE INVENTION

The present invention is directed to a process for producing a composite nonwoven elastic web which is composed of a nonwoven elastic web that is joined to a fibrous nonwoven gathered web. In particular, the process of the present invention produces a composite nonwoven elastic web which, in its relaxed, nonstretched state, is composed of a gathered nonwoven fibrous web that is joined to a nonwoven elastic web with the nonwoven elastic web having been relaxed from a stretched, biased length to a relaxed, unbiased, nonstretched length so as to gather the fibrous nonwoven gathered web. An important feature of the process of the present invention is that the fibrous nonwoven gatherable web is formed directly onto a surface of the nonwoven elastic web while the nonwoven elastic web is maintained in a stretched, biased and elongated condition.

The nonwoven elastic web may be formed by, for example, a meltblowing process or any other process for forming a nonwoven elastic web. For example, the nonwoven elastic web could be an apertured web of an elastic film as opposed to a meltblown fibrous nonwoven elastic web. The formed nonwoven elastic web has a normal relaxed, nonstretched, nonbiased length. Thereafter, the nonwoven elastic web is elongated by being stretched to a stretched, biased length.

In a subsequent step of the process a fibrous nonwoven gatherable web may be formed, for example, by either a meltblowing or spunbonding process or any other process for forming a fibrous nonwoven gatherable web, directly upon a surface of the nonwoven elastic web while the nonwoven elastic web is maintained at its elongated, stretched and biased length. During formation of the fibrous nonwoven gatherable web the nonwoven elastic web is maintained at a stretched length which is at least about 125 percent, that is at least about one and one quarter of the relaxed, unbiased length of the nonwoven elastic web. For example, the stretched, biased length of the nonwoven elastic web may be maintained in the range of from at least about 125 percent of the relaxed, unbiased length of the nonwoven elastic web to about 700 or more percent of the relaxed, unbiased length of the nonwoven elastic web.

The fibrous nonwoven gatherable web is joined to the nonwoven elastic web while the nonwoven elastic web is maintained at its elongated stretched, biased length. This results in the formation of a composite nonwoven elastic web which includes the nonwoven elastic web which is joined to the fibrous nonwoven gatherable web. Because the fibrous nonwoven gatherable web is formed directly onto the surface of the nonwoven elastic web while the nonwoven elastic web is being maintained at its stretched, biased length, the nonwoven elastic web is, at this stage in the process, elongated, stretched and biased and the fibrous nonwoven gatherable web is in an ungathered but gatherable condition.

In one embodiment of the present invention, joining of the fibrous nonwoven gatherable web to the nonwoven elastic web is achieved by heat-bonding to fuse the two webs to each other. The heat-bonding may be carried out within the temperature range of from about 50 degrees centigrade below the melt temperature of at least one of the materials utilized to form at least one of the two webs to about the melt temperature of at least one of the materials utilized to form at least one of the two webs. At high through-put rates the heat-bonding can be carried out above the melt temperature of one or more of the materials utilized to form the webs. The heat-bonding may also be carried out under appropriate conventional pressurized conditions. If desired, conventional sonic bonding techniques may be substituted for the heat-bonding steps.

In another embodiment of the present invention joining of the fibrous nonwoven gatherable web to the stretched nonwoven elastic web is achieved solely by the entanglement of the individual fibers of the fibrous nonwoven gatherable web with the nonwoven elastic web during formation of the fibrous gatherable web on the surface of the elastic web. If the nonwoven elastic web is a fibrous nonwoven elastic web formed by, for example, meltblowing, entanglement of the individual fibers of the fibrous nonwoven gatherable web with the fibrous nonwoven elastic web is achieved by entanglement of the individual fibers of the fibrous gatherable web with the individual fibers of the fibrous elastic web. If the nonwoven elastic web is an apertured film, joining of the fibrous nonwoven web with the film is achieved by entanglement of the individual fibers of the fibrous gatherable web within the apertures of the film.

In yet another embodiment, discussed below, the joining of the two webs to each other is achieved by also forming the nonwoven elastic web out of a tacky elastic material.

In any of the embodiments of the presently inventive process joining of the two webs to each other may be further enhanced by applying pressure to the two webs after the gatherable web has been formed on the surface of the elastic web. Also, in any embodiment, joining of the two webs may be further improved by applying an adhesive material to the upper surface of the nonwoven elastic web prior to formation of the fibrous nonwoven gatherable web thereon.

After joining of the two webs to each other has been achieved to form a composite elastic web, the biasing force is removed from the composite nonwoven elastic web and the composite elastic web is allowed to relax to its normal relaxed, unbiased length. Because the fibrous nonwoven gatherable web is joined to the nonwoven elastic web while the nonwoven elastic web is stretched, relaxation of the composite nonwoven elastic web results in the gatherable web being carried with the contracting nonwoven elastic web and thus being gathered.

After gathering of the fibrous nonwoven gatherable web has occurred by reducing the biasing force on the composite nonwoven elastic web, the composite nonwoven elastic web may be rolled up in rolls for storage and shipment. The composite elastic web may thereafter be utilized to form a wide range of products, such as, for example, an outer cover for a diaper.

In one particular embodiment of the process of the present invention a tacky fibrous nonwoven elastic web is formed by, for example, meltblowing microfibers of a tacky elastic material such as, for example, an A-B-A' block copolymer or blends of such A-B-A' block copolymers with poly(alpha-methylstyrene) where A and A' are each thermoplastic polystyrene or polystyrene homologue end blocks and B is an elastic polyisoprene midblock. In some embodiments A may be the same thermoplastic polystyrene or polystyrene homologue endblock as A'. The tacky fibrous nonwoven elastic web is then elongated by being stretched to an elongated, stretched length and a fibrous nonwoven gatherable web is formed, for example, by meltblowing or spunbonding the fibrous nonwoven gatherable web, directly upon a surface of the tacky fibrous nonwoven elastic web while maintaining the fibrous nonwoven elastic web at its stretched length. As a result of the fact that the fibrous nonwoven elastic web is tacky, the fibrous nonwoven gatherable web is simultaneously formed upon and adhesively joined to the surface of the tacky fibrous nonwoven elastic web. This embodiment results in the formation of a composite nonwoven elastic web having an ungathered fibrous gatherable web adhesively joined to the tacky fibrous nonwoven elastic web with the joining of the two webs to each other being acheived by the adhesive joining which occurs during formation of the fibrous nonwoven gatherable web on the surface of the fibrous nonwoven elastic web. The adhesive joining of the two webs to each other may be increased upon application pressure to the composite nonwoven elastic web by passing the composite nonwoven elastic web through the nip between rollers, which may be unheated, after the composite web has been formed but before the fibrous tacky nonwoven elastic web is allowed to relax. The adhesive joining may be further enhanced by application of an adhesive material to the surface of the tacky fibrous nonwoven elastic web prior to formation of the gatherable web thereon.

The composite nonwoven elastic web is then allowed to relax to its normal relaxed, unbiased length. Because the fibrous nonwoven gatherable web was joined to the tacky fibrous nonwoven elastic web while the tacky fibrous nonwoven elastic web was in a stretched condition, relaxation of the composite nonwoven elastic web and thus the tacky fibrous nonwoven elastic web results in the gatherable web being carried with the contracting fibrous nonwoven elastic web and thus being gathered.

After gathering of the fibrous nonwoven gatherable web has occurred the composite nonwoven elastic web may be rolled up in rolls for storage and shipment. In order to avoid adhesion of the exposed side of the tacky fibrous nonwoven elastic web upon rolling-up of the composite nonwoven elastic web it is preferred for a second fibrous nonwoven gatherable web to be applied to the exposed surface of the fibrous nonwoven elastic web prior to the gathering step. Alternatively, butcher paper may be applied, either before or after gathering of the gatherable web, to the exposed tacky surface of the tacky fibrous nonwoven elastic web and later removed prior to utilization of the composite nonwoven elastic web. The composite elastic web may thereafter be utilized to form a wide variety of products.

The invention is also directed to a composite nonwoven elastic web composed of a nonwoven elastic web that is joined to a gatherable fibrous nonwoven web which has been gathered and with the composite web having been formed by any of the embodiments of the inventive process. In particular, the composite nonwoven elastic web, in its relaxed, nonstretched state, is composed of a nonwoven elastic web that is joined to a fibrous nonwoven gathered web which has been gathered as a result of the nonwoven elastic web having been relaxed from an elongated stretched, biased length to a relaxed, unbiased nonstretched length. Exemplary elastomeric materials for use in formation of the fibrous nonwoven elastic web include polyester elastomeric materials, polyurethane elastomeric materials, and polyamide elastomeric materials. Other elastomeric materials for use in formation of the fibrous nonwoven elastic web include (a) A-B-A' block copolymers, where A and A' are each a thermoplastic polymer endblock which includes a styrenic moiety and where A may be the same thermoplastic polymer endblock as A', such as a poly(vinyl arene), and where B is an elastomeric polymer midblock such as a conjugated diene or a lower alkene or (b) blends of one or more polyolefins or poly(alpha-methyl styrene) with A-B-A' block copolymers, where A and A' are each a thermoplastic polymer endblock which includes a styrenic moiety, where A may be the same thermoplastic polymer endblock as A', such as a poly(vinyl arene) and where B is an elastomeric polymer midblock such as a conjugated diene or a lower alkene. The A and A' endblocks may be selected from the group including polystyrene and polystyrene homologs and the B midblock may be selected from the group including polyisoprene, polybutadiene or poly(ethylene-butylene). If A and A' are selected from the group including polystyrene or polystyrene homologs and B is poly(ethylene-butylene), materials which may be blended with these block copolymers are polymers, including copolymers of ethylene, propylene, butene, other lower alkenes or one or more of these materials. If A and A' are selected from the group including polystyrene or polystyrene homologs and B is a polyisoprene midblock, a material for blending with this type of block copolymer is poly(alpha-methylstyrene).

Preferably, the gatherable web includes at least one fibrous nonwoven web that includes nonelastic fibers which may be formed by meltblowing, spunbonding or any other process for forming a fibrous nonwoven gatherable web. Preferred materials for forming the gatherable web include polyester materials, polyolefin materials or blends of one or more polyester materials with one or more polyolefin materials. An exemplary polyester material is polyethylene terephthalate. An exemplary polyolefin material is polypropylene.

DESCRIPTION OF THE PREFERRED EMBODIMENTS

Figure 1:
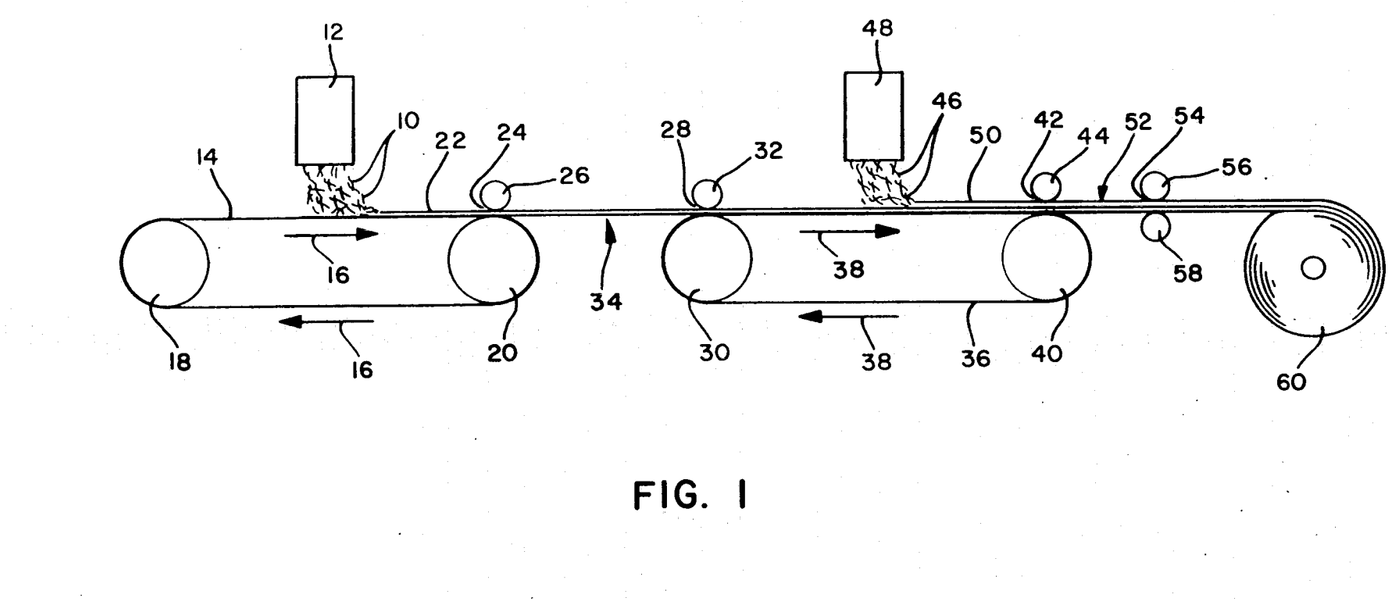
FIG. 1 is a schematic view illustrating one mode for carrying out the method of the present invention.

Turning now to the figures wherein like reference numerals represent like structure and, in particular, to FIG. 1, it can be seen that meltblown microfibers 10 which are formed by a conventional meltblowing die 12 are collected on a porous collecting screen 14 which is moving, as indicated by the arrows 16 in FIG. 1, about the rollers 18 and 20. The material which is utilized to form the meltblown microfibers 10 is, for reasons which will hereinafter become clear, an elastomeric material which will be discussed in detail hereinbelow. The porous collecting screen 14 is driven by the rotating rollers 18 and 20 which, in turn, are driven by a conventional drive arrangement (not shown). Also not shown for purposes of clarity is a conventional vacuum box located between the rollers 18 and 20 and beneath the lower surface of the upper portion of the screen 14. The vacuum box assists in the retention of the microfibers 10 on the upper surface of the screen 14. As the meltblown microfibers 10 are deposited upon the moving collecting screen 14 they entangle and cohere to form a cohesive fibrous nonwoven elastic web 22. The entangled cohesive fibrous nonwoven elastic web 22 is carried by the porous collecting screen 14 to the nip or gap 24 between the rotating roller 20 and a rotating nip roller 26. The nip or gap 24 between the two rollers 20 and 26 is adjusted so that the rollers 20 and 26 firmly engage the fibrous nonwoven elastic web 22 without adversely affecting the web 22. The rate of rotation of the rollers 20 and 26 is adjusted so that the peripheral surface speed of the rollers 20 and 26 is substantially the same as the speed of the moving porous collecting screen 14. If, upon lay-down on the surface of the porous screen 14, the meltblown microfibers 10 are insufficiently cohered to each other to form a cohesive web 22 capable of performing the hereinafter discussed stretching and relaxing steps without being adversely affected (e.g. the web separates, loses it integrity, upon application of a stretching force), the cohesion of the microfibers 10 to each other may be improved by, for example, heat-bonding the microfibers 10 to each other by maintaining the roller 16 at an appropriate elevated temperature which will vary depending upon the degree of cohesion desired and the cohesive characteristics of the material utilized to form the microfibers 10. After passing through the nip 24 the fibrous nonwoven elastic web 22 is forwarded by the action of the rollers 20 and 26 into and passes through a second nip or gap 28 which is formed between a rotating roller 30 and a second rotating nip roller 32. Rotation of the rollers 30 and 32 is adjusted so that the peripheral surface speed of the rollers 30 and 32 is greater than the peripheral surface speed of the rollers 20 and 26. The nip 28 between the two rollers 30 and 32 is adjusted so that the rollers 30 and 32 firmly engage the fibrous nonwoven elastic web 22 without adversely affecting the web 22. As a result of the increase in the peripheral surface speed of the rollers 30 and 32 with respect to the peripheral surface speed of the rollers 20 and 26 a longitudinal or machine direction (MD) biasing force is placed on the fibrous nonwoven elastic web 22 and the web 22 is stretched to an extended, stretched, biased length in the longitudinal direction. The degree of stretching of the fibrous nonwoven elastic web 22 which occurs in the area 34 between the rollers 20 and 26 and the rollers 30 and 32 may be varied, for example, by varying the peripheral surface speed of the rollers 30 and 32 with respect to the peripheral surface speed of the rollers 20 and 26. For example, if the peripheral surface speed of the rollers 30 and 32 is twice that of the rollers 20 and 26, the fibrous nonwoven elastic web 22 will be stretched to a stretched length of substantially about twice, that is, about 200 percent, of its original relaxed unstretched, unbiased length. It is preferred that the fibrous nonwoven web 22 be stretched to a stretched length of at least about 150 percent of its original, relaxed, unbiased length. In particular, it is preferred for the fibrous nonwoven web 22 to be stretched to a stretched length of from at least about 150 percent of the relaxed, unbiased length of the fibrous nonwoven web 22 to about 700 or more percent of the relaxed, unbiased length of the fibrous nonwoven web 22.

After the fibrous nonwoven elastic web 22 has been stretched, by the combined actions of rollers 20 and 26 and 30 and 32, the web 22 is passed onto a second porous collecting screen 36 which is moving as is indicated by the arrows 38 in FIG. 1. The second porous collecting screen 36 moves about and is driven by the rotating roller 30 in conjunction with a rotating roller 40. The rotating rollers 30 and 40 are, in turn, driven by a conventional driving arrangement (not shown) which may be the same arrangement that is driving the rotating rollers 18 and 20. Also not shown for purposes of clarity is a conventional vacuum box located between the rollers 30 and 40 and beneath the lower surface of the upper portion of the screen 36. The vacuum box assists in the retention of the web 22 on the upper surface of the screen 36. The stretched fibrous nonwoven elastic web 22 is carried by the second porous collecting screen 36 to a nip or gap 42 which is formed between the rotating roller 40 and a third rotating nip roller 44. Rotation of the rotating roller 40 and the nip roller 44 is adjusted so that the peripheral surface speed of the two rollers 40 and 44 is substantially the same as the peripheral surface speed of the rollers 30 and 32. Because the peripheral surface speed of the rollers 40 and 44 is maintained at substantially the same peripheral surface speed as that of the rollers 30 and 32 and because the nip 42 is adjusted so that the rollers 40 and 44 firmly retain the fibrous nonwoven elastic web 22, without adversely affecting the web 22, the stretched condition of the fibrous nonwoven elastic web 22 is maintained while the fibrous nonwoven elastic web 22 is being carried by the second porous collecting screen 36.

While the stretched fibrous nonwoven elastic web 22 is being carried by the second porous collecting screen 36 meltblown microfibers 46, formed by a conventional meltblowing die 48, are meltblown directly onto the upper surface of the stretched nonwoven elastic web 22 to form a cohesive fibrous nowoven gatherable web 50 which is located on the upper surface of the stretched fibrous nonwoven elastic web 22. Care should be taken to adjust the distance between the die tip of the meltblowing die 48 and the elastic web 22 and the speed at which the elastic web 22 passes under the die tip of the meltblowing die 48, as it has been found that the hot air exiting the die tip will melt the elastic web 22 if these adjustments, which will vary with the material or blend of materials from which the elastic web 22 is formed, are not properly made. As the meltblown microfibers 46 are collected on the upper surface of the fibrous nonwoven elastic web 22, they entangle and cohere with each other to form the cohesive fibrous nonwoven gatherable web 50. Depending upon the distance between the die tip of the meltblowing die 48 and the upper surface of the stretched fibrous nonwoven elastic web 22 the meltblown microfibers 46 may also mechanically entangle with the fibers of the elastic web 22. Generally speaking, as the distance between the die tip of the meltblowing die 48 and the upper surface of the stretched fibrous nonwoven elastic web 22 is increased the mechanical entanglement of the fibers of the web 50 with the fibers of the web 22 decreases. To assure mechanical entanglement of the fibers of the web 50 with the fibers of the web 22 the distance between the die tip of the meltblowing die 48 and the upper surface of the web 22 should be no greater than about 25 inches. Preferably, the distance between the die tip of the meltblowing die 48 and the upper surface of the web 22 should range from about 6 inches to about 16 inches. Depending on the materials utilized to form the webs 22 and 50 and the distance between the die tip of the meltblowing die 48 and the upper surface of the web 22 some adhesion of the fibers of the gatherable web 50 to the fibers of the elastic web 22 may also occur. The materials which are appropriate for utilization in forming the fibrous nonwoven gatherable web 50 are preferably selected after selection of the elastomeric material for utilization in formation of the fibrous nonwoven elastic web 22 has occurred. In particular, the material selected to form the fibrous nonwoven gatherable web 50 must be a material which forms a web 50 that is gatherable by the contracting force of the fibrous nonwoven elastic web 22. Because the contracting force of the web 22 will vary with the material selected for formation of the web 22, the material selected for formation of the web 50 will have to be selected accordingly. Exemplary, materials for utilization in forming the web 50 are disclosed hereinafter.

Depending upon the characteristics which are desired for the final product, the materials which are utilized to form the fibers which compose the two webs 22 and 50 and the process steps/conditions utilized, the two cohesive webs 22 and 50 may be joined to each other in a variety of ways. For example, if a relatively weak joining of the two webs 22 and 50 to each other is desired, the two webs 22 and 50 can be joined to each other solely by the entanglement of the individual meltblown fibers of the fibrous nonwoven gatherable web 50 with the individual meltblown fibers of the fibrous nonwoven elastic web 22 which occurs during formation of the web 50 on the stretched surface of the web 22. In this embodiment, the two webs 22 and 50 are usually separable from each other upon application of a relatively small amount of force such as, for example, a light picking or rubbing force applied by an individual's fingers. In the event that a stronger joining of the two cohesive webs 22 and 50 to each other is desired, joining of the fibrous nonwoven gatherable web 50 to the fibrous nonwoven elastic web 22 can be achieved, while continuing to maintain the fibrous nonwoven elastic web 22 at its stretched length, by heat-bonding the two webs 22 and 50 to each other. The heat-bonding can be achieved by, for example, passing the two webs 22 and 50 between the rollers 40 and 44 with the rollers 40 and 44 being arranged to apply appropriate heat-bonding temperatures and pressures to the two webs 22 and 50. For example, joining of the fibrous nonwoven gatherable web 50 to the fibrous nonwoven elastic web 22 may be achieved by heat-bonding of the two webs 22 and 50 to each other with the rollers 40 and 44 being maintained within the temperature range of from about 50 degrees centigrade below the melting point of at least one of the materials used to form the web 22 and 50 to about the melt temperature of at least one of the materials utilized to form the webs 22 and 50. However, at high through-put rates the heat-bonding can be carried out above the melt temperature of one or more of the materials utilized to form the two webs 22 and 50 since the webs 22 and 50 will be exposed to the high temperature for a short time. Pressurized heat-bonding of the two webs 22 and 50 to each other may be carried out at conventional, appropriate bonding pressures by adjusting the nip 42. Other conventional alternatives to heat-bonding the two webs 22 and 50 to each other may be substituted for the heat-bonding steps. For example, a conventional sonic bonding arrangement (not shown) could be substituted for the heat-bonding arrangement 40 and 44. It should be noted that the joining of the two webs 22 and 50 to each other is usually improved somewhat just by passage of the webs 22 and 50 through the nip 42 since such passage results in application of pressure to the two webs 22 and 50 and thus increased entanglement of the individual fibers of the two webs 22 and 50.

After the fibrous nonwoven elastic web 22 has been joined to the fibrous nonwoven gatherable web 50 to form a composite nonwoven elastic web 52 the biasing force on the fibrous nonwoven elastic web 22 is relaxed by, for example, passing the composite nonwoven elastic web 52, which includes both the fibrous nonwoven elastic web 22 and the fibrous nonwoven gatherable web 50, through the nip or gap 54 formed by a pair of rotating nip rollers 56 and 58. The nip 54 is adjusted so that the rollers 56 and 58 firmly engage the composite web 52 without adversely affecting the composite web 52. The rotation of the pair of nip rollers 56 and 58 is adjusted so that the peripheral surface speed of the nip rollers 56 and 58 allows the composite nonwoven elastic web 52 to relax and, as a result of its elastic properties, to contract to its relaxed, unbiased length. The relaxing and contracting of the composite nonwoven elastic web 52 to its relaxed, unbiased length results in the fibrous nonwoven gatherable web 50, which is joined to the fibrous nonwoven elastic web 22, being carried along with, that is contracted, and thus gathered upon the upper surface of the contracting fibrous nonwoven elastic web 22.

After relaxing and contracting of the composite nonwoven elastic web 52, the composite web 52 may be rolled up on a supply roller 60 for storage and shipment. The composite nonwoven elastic web 52 may thereafter be utilized in the manufacture of wide variety of items such as, for example, an outer cover material for a diaper or other garment.

The fibrous nonwoven elastic web 22 portion of the composite nonwoven elastic web 52 may be formed from any elastomeric material which may be formed into a fibrous nonwoven elastic web 22. Exemplary elastomeric materials for use in formation of the fibrous nonwoven elastic web 22 include polyester elastomeric materials such as, for example, polyester elastomeric materials available under the trade designation Hytrel from E. I. DuPont DeNemours & Co., polyurethane elastomeric materials such as, for example, polyurethane elastomeric materials available under the trade designation Estane from B. F. Goodrich & Co. and polyamide elastomeric materials such as, for example, polyamide elastomeric materials available under the trade designation Pebax from the Rilsan Company. Other elastomeric materials for use in forming the fibrous nonwoven elastic web 22 include (a) elastomeric A-B-A' block copolymers, where A and A' are each a thermoplastic polymer endblock which includes a styrenic moiety and where A may be the same thermoplastic polymer endblock as A', for example, a poly (vinyl arene), and where B is an elastomeric polymer midblock such as conjugated diene or a lower alkene and (b) blends of one or more polyolefins or poly (alpha-methylstyrene) with elastomeric A-B-A' block copolymer materials, where A and A' are each polymer thermoplastic endblocks containing a styrenic moiety and where A may be the same thermoplastic polymer endblock as A', such as a poly (vinyl arene) and where B is an elastomeric polymer midblock, such as a conjugated diene or a lower alkene. The A and A' materials may be selected from the group of materials including polystyrene or polystyrene homologs and the B material may be selected from the group of materials including polyisoprene, polybutadiene and poly (ethylene-butylene). Materials of this general type are disclosed in U.S. Pat. Nos. 4,323,534 to Des Marais and 4,355,425 to Jones and in the aforementioned Shell brochure. Commercially available elastomeric A-B-A' block copolymers having a saturated or essentially saturated poly (ethylene-butylene) midblock "B" represented by the formula:

poly(ethylene-butylene)

where x, y and n are positive integers, and polystyrene endblocks A and A' represented by the formula:

polystyrene where n is a positive integer which may be the same or different for A and A', are sometimes referred to as S-EB-S block copolymers and are available under the trade designation KRATON G, for example, KRATON G 1650, KRATON G 1652 and KRATON GX 1657, from the Shell Chemical Company. Other elastomeric resins which may be utilized are A-B-A' block copolymers where A and A' are polystyrene endblocks, as defined above, and "B" is a polybutadiene midblock represented by the following formula:

polybutadiene where n is a positive integer. This material is sometimes referred to as a S-B-S block copolymer and is available under the trade designation KRATON D, for example, KRATON D 1101, KRATON D 1102 and KRATON D 1116, from the Shell Chemical Company. Another S-B-S block copolymer material may be obtained under the trade designation Solprene 418 from the Phillips Petroleum Company. Yet other elastomeric resins which may be utilized are A-B-A' block copolymers where A and A' are polystyrene endblocks, as defined above, and B is a polyisoprene midblock where the midblock is represented by the formula:

polyisoprene where n is a positive integer. These block copolymers are sometimes referred to as S-I-S block copolymers and are available under the trade designation KRATON D, for example, KRATON D 1107, KRATON D 1111, KRATON D 1112 and KRATON D 1117, from the Shell Chemical Company.

A summary of the typical properties of the above-identified KRATON D and KRATON G resins at 74° Fahrenheit is presented below in Tables I and II.

TABLE I

| PROPERTY | KRATON D | | | | | | |
|---|---|---|---|---|---|---|---|
| | D-1101 | D-1102 | D-1107 | D-1111 | D-1112 | D-1116 | D-1117 |
| Tensile Strength, psi[1] | 4,600[2] | 4,600[2] | 3,100[2] | 2,900[2] | 1,500[2] | 4,600[5] | 1,200[2] |
| 300% Modulus, psi[1] | 400 | 400 | 100 | 200 | 70 | 350 | 60 |
| Elongation, %[1] | 880 | 880 | 1,300 | 1,200 | 1,400 | 900 | 1,300 |
| Set at Break, % | 10 | 10 | 10 | 10 | 20 | 10 | 15 |
| Hardness, Shore A | 71 | 71 | 37 | 52 | 34 | 65 | 32 |
| Specific Gravity | 0.94 | 0.94 | 0.92 | 0.93 | 0.92 | 0.94 | 0.92 |
| Brookfield Viscosity, (Toluene Solution) cps at 77° F. | 4,000[3] | 1,200[3] | 1,600[3] | 1,300[3] | 900[3] | 9,000[3] | 500[3] |
| Melt Viscosity Melt Index, Condition G, gms/10 min. | 1 | 6 | 9 | — | — | — | — |
| Plasticizer Oil Content, % w | 0 | 0 | 0 | 0 | 0 | 0 | 0 |
| Styrene/Rubber[6] Ratio | 31/69 | 28/72 | 14/86 | 21/79 | 14/86 | 21/79 | 17/83 |
| Physical Form | Porous Pellet | Porous Pellet | Pellet | Porous Pellet | Pellet | Porous Pellet | Pellet |

TABLE II

| PROPERTY | KRATON G | | |
|---|---|---|---|
| | G-1650 | G-1652 | GX-1657 |
| Tensile Strength, psi[1] | 5,000[2] | 4,500[2] | 3,400[2] |
| 300% Modulus, psi[1] | 800 | 700 | 350 |
| Elongation, %[1] | 500 | 500 | 750 |
| Set at Break, % | — | — | — |
| Hardness, Shore A | 75 | 75 | 65 |
| Specific Gravity | 0.91 | 0.91 | 0.90 |
| Brookfield Viscosity, (Toluene Solution) cps at 77° F. | 1,500[4] | 550[4] | 1,200[4] |
| Melt Viscosity, Melt Index, Condition G, gms/10 min. | — | — | — |
| Plasticizer Oil Content, % w | 0 | 0 | 0 |
| Sytrene/Rubber[6] Ratio | 28/72 | 29/71 | 14/86 |
| Physical Form | Crumb | Crumb | Pellet |

[1]ASTM method D412-tensile test jaw separation speed 10 in./min.
[2]Typical properties determined on film cast from a toluene solution.
[3]Neat polymer concentration, 25% w.
[4]Neat polymer concentration, 20% w.
[5]Property determined by extrapolation to zero oil content of results measured on oil extended films cast from toluene solution.
[6]The ratio of the sum of the molecular weights of the endblocks (A + A') to the molecular weight of the B midblock.
For example, with respect to KRATON G - 1650 the molecular weight of the endblocks (A + A') is 28 percent of the molecular weight of the A-B-A' block copolymer.

Meltblowing of the S-EB-S KRATON G block copolymers in pure, i.e. neat, form has proven to be difficult except at elevated temperatures and low throughputs such as from at least about 550 degrees Fahrenheit to about 625 degrees Fahrenheit or more and below at least about 0.14 grams per die capillary per minute. In order to avoid these elevated temperature and low through-put conditions, blending of certain materials with several of the different types of KRATON G materials has proven to provide a satisfactory meltblowable material. For example, blends of certain polyolefin materials with the S-EB-S block copolymer has resulted in a meltblowable material. In particular, if a polyolefin is to be blended with the KRATON G S-EB-S block copolymers, the polyolefin is preferably a polymer, including copolymers, of ethylene, propylene, butene, other lower alkenes or blends of one or more of these materials. A particularly preferred polyolefin for blending with the KRATON G S-EB-S block copolymers is polyethylene and a preferred polyethylene may be obtained from U.S.I. Chemicals Company under the trade designation Petrothene Na601. (Also referred to herein as Pe Na601 or Na601.) A preferred polypropylene may be obtained from the Himont Company under the trade designation PC-973.

Information obtained from U.S.I. Chemical Company states that the Na601 is a low molecular weight, low density polyethylene for application in the areas of hot melt adhesives and coatings. U.S.I. has also stated that the Na601 has the following nominal values: (1) a Brookfield Viscosity, cP at 150 degrees Centigrade of 8500 and at 190 degrees Centigrade of 3300 when measured in accordance with ASTM D 3236; (2) a density of 0.903 grams per cubic centimeter when measured in accordance with ASTM D 1505; (3) an equivalent Melt index of 2000 grams per ten minutes when measured in accordance with ASTM D 1238; (4) a ring and ball softening point of 102 degrees Centigrade when measured in accordance with ASTM E 28; (5) a tensile of 850 pounds per square inch when measured in accordance with ASTM D 638; (6) an elongation of 90 percent when measured in accordance with ASTM D 638; (7) a modulus of Rigidity, $T_F$ (45,000) of $-34$ degrees Centigrade and (8) a penetration Hardness, (tenths of mm) at 77 degrees Fahrenheit of 3.6.

The Na601 is believed to have a number average molecular weight (Mn) of about 4,600; a weight average molecular weight (Mw) of about 22,400 and a Z average molecular weight (Mz) of about 83,300. The polydisperisity of the Na601 (Mw/Mn) is about 4.87, where Mn is calculated by the formula:

$$Mn = \frac{Sum\ [(n)\ (MW)]}{Sum\ (n)}$$

and Mw is calculated by the formula:

$$Mw = \frac{Sum\ [(n)\ (MW)^2]}{Sum\ [(n)\ (MW))]}$$

and MZ is calculated by the formula:

$$Mz = \frac{Sum\ [(n)\ (MW)^3]}{Sum\ [(n)\ (MW)^2]}$$

where:

MW = The various molecular weights of the individual molecules in a sample, and n = The number of molecules in the given sample which have a given molecular weight of MW.

Blending polyolefins with the S-I-S and S-B-S block copolymers followed by meltblowing of the blend has, to date, proved to be unsatisfactory in that the blends appear to be incompatible. However, a good material for blending with the S-I-S block copolymers is poly (alpha-methylstyrene) and a preferred poly (alpha-methylstyrene) may be obtained from Amoco under the trade designation 18-210.

Preferably, the fibrous nonwoven gatherable web 50 portion of the composite nonwoven elastic web 52 formed by the process of the present invention may be formed from any gatherable material which may be formed into a fibrous nonwoven gatherable web 50. For example, the fibrous nonwoven gatherable web 50 could be formed from a blend of a nonelastic material with an elastic material, one or more nonelastic materials or a blend of one or more elastic materials with two or more nonelastic materials. Preferably, the fibrous nonwoven gatherable web 50 is formed from a fiber-forming meltblowable or spunbondable nonelastic gatherable material. Exemplary fiber-forming materials for use in forming the fibrous nonwoven gatherable web are polyester materials, polyolefin materials or blends of one or more polyester materials with one or more polyolefin materials. An exemplary polyester fiber-forming material is polyethylene terephthalate. An exemplary fiber-forming polyolefin material is polypropylene. Preferred polypropylene materials may be obtained under the trade designation PC 973 and PF 301 from the Himont Company.

Typical characteristics of the Himont PC-973 polyproylene stated by Himont are a density of about 0.900 grams per cubic centimeter, measured in accordance with ASTM D 792; a meltflow rate obtained in accordance with ASTM D 1238, condition L, of 35 grams per ten (10) minutes; tensile of about 4,300 pounds per square inch (psi) measured in accordance with ASTM D 638; flex modulus of about 182,000 psi measured in accordance with ASTM D 790, B and a Rockwell hardness, R scale, of 93 measured in accordance with ASTM D 785 A. The PC-973 is believed to have a number average molecular weight (Mn) of about 40,100; a weight average molecular weight (Mw) of about 172,000 and a Z average molecular weight of about 674,000. The polydispersity (Mw/Mn) of the PC-973 is about 4.29.

In one particular embodiment of the present invention the composite nonwoven elastic web 52 is composed of a fibrous nonwoven elastic web 22 which is joined to a gatherable fibrous nonwoven web 50. The composite nonwoven elastic web 52 of this embodiment differs from the composite nonwoven elastic web 52 of the above-described embodiments in that the joining of the two webs 22 and 50 of the composite nonwoven elastic web 52 is achieved without application of heat and/or pressure during the bonding step yet is stronger than the joining achieved by entanglement of the fibers of the nonwoven gatherable web 50 with the fibers of the nonwoven elastic web 22 during formation of the web 50 on the web 22. In this particular embodiment the fibrous nonwoven elastic web 22 is formed from a tacky elastomeric material so that, upon its formation, the fibrous nonwoven elastic web 22 is tacky. The tacky fibrous nonwoven elastic web 22 is formed by meltblowing the web 22 onto the porous collecting screen 14. Alternatively, a tacky nonwoven elastic apertured film could be substituted for the tacky fibrous nonwoven elastic web 22. Thereafter, the tacky fibrous nonwoven elastic web 22 is stretched to a stretched length of at least about one and one quarter, that is at least about 125 percent of its relaxed, unbiased length by the combined action of the rollers 20 and 26 and 30 and 32. In particular, it is preferred for the tacky fibrous nonwoven elastic web 22 to be stretched to a length of from about 125 percent of the relaxed, unbiased length of the tacky fibrous nonwoven elastic web to about 700 or more percent of the relaxed, unbiased length of the tacky fibrous nonwoven web 22.

After the tacky fibrous nonwoven elastic web 22 has been stretched it is carried by the second porous collecting screen 36 to the nip or gap 42 between the rotating roller 40 and the rotating nip roller 44. While the web 22 is being carried by the second porous collecting screen 36, the fibrous nonwoven gatherable web 50 is formed directly on the upper surface of the tacky web 22 by either a conventional meltblowing or spunbonding process or by any other conventional method which may be utilized to form a fibrous nonwoven gatherable web 50, such as, for example, conventional carding apparatus for forming a carded web. As was the case with the prior discussed embodiments, during formation of the fibrous nonwoven gatherable web 50 on the surface of the web 22 the tacky fibrous nonwoven elastic web 22 is maintained at its stretched, biased length by appropriately adjusting the peripheral surface speed of the rollers 40 and 44 with respect to the peripheral speed of the rollers 30 and 32. As a result of the fact that the fibrous nonwoven elastic web 22 is, upon its formation, tacky, an improved joining (as compared to joining of the two webs solely by entanglement) of the tacky fibrous nonwoven elastic web 22 to the fibrous nonwoven gatherable web 50 is achieved by adhesion of the two webs 20 and 50 to each other during formation of the fibrous nonwoven gatherable web 50 upon the top surface of the fibrous nonwoven elastic web 22. This results in the simultaneous formation and joining of the fibrous nonwoven gatherable web 50 to the fibrous nonwoven elastic web 22. While any tacky elastomeric material may be utilized in forming the tacky fibrous nonwoven elastic web 22 of this embodiment a preferred tacky elastomeric material is an elastomeric A-B-A' block copolymer, where A and A' are each thermoplastic polystyrene endblocks and where B is a polyisoprene midblock. Tri-block copolymer materials of this type are sometimes called S-I-S block copolymers and may be obtained under the trade designation KRATON D, for example, KRATON D 1107, KRATON D 1111, KRATON D 1112 and KRATON D 1117, from the Shell Chemical Company. Alternatively, a blend of a S-I-S block copolymer and poly (alpha-methylstyrene) may be utilized.

The materials which may be utilized to form the fibrous nonwoven gatherable web 50 of this embodiment may include any of the materials which were stated above with regard to the fibrous nonwoven gatherable web 50. That is, the fibrous nonwoven gatherable web may be formed from any gatherable material which may be formed into a fibrous nonwoven gatherable web 50. For example, the fibrous nonwoven gatherable web 50 could be formed from a blend of a nonelastic material with an elastic material, one or more nonelastic materials or a blend of one or more elastic materials with two or more nonelastic materials. Preferably, the fibrous nonwoven gatherable web 50 is formed from a fiber-forming meltblowable or spunbondable nonelastic gatherable material. However, the fibrous nonwoven gatherable web 50 may be formed by depositing a carded web on the surface of the fibrous nonwoven elastic web 22 or by any other method which may be utilized to form a fibrous nonwoven gatherable web 50 on the surface of the web 22. Exemplary fiber-forming materials for use in forming the fibrous nonwoven gatherable web 50 are polyester materials, polyolefin materials or blends of one or more polyester materials with one or more polyolefin materials. An exemplary polyester fiber-forming material is polyethylene terephthalate. An exemplary fiber-forming polyolefin material is polypropylene. Preferred polypropylene materials may be obtained from the Himont Company under the trade designations PC 973 and PF 301.

In some situations it may be desirable to incorporate discrete particles of one or more solid materials into one or both of the webs 22 and 50 during formation of the webs 22 and 50. For example, it may be desirable to incorporate one or more fibers such as cotton fibers, wood pulp fibers, polyester fibers or other particulates into one or both of the webs 22 and 50 during their formation. This may be accomplished by utilization of conventional coforming apparatus in conjunction with the meltblowing or spunbonding apparatus 12 and/or 48. Such coforming apparatus is well known to those in the art and is generally illustrated by the apparatus disclosed in U.S. Pat. No. 4,100,432 to Anderson. The disclosure of this patent is hereby incorporated by reference.

After the fibrous nonwoven gatherable web 50 has been formed upon and simultaneously joined to the upper surface of the fibrous nonwoven tacky elastic web 22 the composite nonwoven elastic web 52 is passed through the rollers 40 and 44 which, for the reasons stated above, need not be heated or need not apply any excessive pressure to the composite elastic web 52. Thereafter, the stretching and biasing force on the tacky nonwoven elastic web 22 is released so as to relax and contract the composite nonwoven elastic web 52. Because the fibrous nonwoven gatherable web 50 is joined to the surface of the tacky fibrous nonwoven elastic 22 while the tacky fibrous nonwoven elastic web 22 is stretched, relaxing and contraction of the composite nonwoven tacky web 52 results in the fibrous nonwoven gatherable web 50 being carried with, contracted and thereby gathered into a soft batted or matted web 50 which is joined to the surface of the elastic web 22.

EXAMPLE I

A fibrous nonwoven elastic web which had previously been formed by meltblowing a blend of 60 percent, by weight, of an A-B-A' block copolymer having polystyrene A and A' end blocks and a poly (ethylene-butylene) "B" midblock (obtained from the Shell Chemical Company under the trade designation KRATON GX 1657) and 40 percent, by weight, of a polyethylene (obtained from U.S.I. Chemical Company under the trade designation PE Na601) was provided in rolled-up form.

The prior meltblowing of the fibrous nonwoven elastic web was accomplished by extruding the blend of materials through a meltblowing die having thirty extrusion capillaries per lineal inch of die tip. The capillaries each had a diameter of about 0.0145 inches and a length of about 0.113 inches. The blend was extruded through the capillaries at a rate of about 0.52 grams per capillary per minute at a temperature of about 595 degrees Fahrenheit. The extrusion pressure exerted upon the blend was measured as 73 pounds per square inch, gage in the capillaries. The die tip configuration was adjusted so that it was recessed about 0.090 inches inwardly from the plane of the external surface of the air plates which form the forming air gaps on either side of the capillaries. The air plates were adjusted so that the two forming air gaps, one on each side of the extrusion capillaries, formed air gaps of about 0.067 inches. Forming air for meltblowing the blend was supplied to the air gaps at a temperature of about 600 degrees Fahrenheit and at a pressure of about 4 pounds per square inch, gage. The meltblown fibers thus formed were blown onto a forming screen which was approximately 15 inches from the die tip.

Later, the thus formed fibrous nonwoven elastic web was unrolled and stretched by applying a tensioning, i.e. biasing, force in the machine direction (MD) and a fibrous nonwoven gatherable web was formed on the surface of the elastic web by meltblowing polypropylene (obtained from the Himont Company under the trade designation PC 973) as microfibers onto the upper surface of the fibrous nonwoven elastic web while the fibrous nonwoven elastic web was maintained at its stretched length.

Meltblowing of the fibrous nonwoven gatherable polypropylene web was accomplished by extruding the polypropylene through a meltblowing die having thirty extrusion capillaries per lineal inch of die tip. The capillaries each had a diameter of about 0.0145 inches and a length of about 0.113 inches. The polypropylene was extruded through the capillaries at a rate of about 0.38 grams per capillary per minute and at a temperature of about 590 degrees Fahrenheit. The extrusion pressure exerted upon the polypropylene was measured as 29 pounds per square inch, gage in the capillaries. The die tip configuration was adjusted so that it was about coplanar with the plane of the external surface of the air plates which form the forming air gaps on either side of the capillaries. The air plates were adjusted so that the two forming air gaps, one on each side of the extrusion capillaries, formed air gaps of about 0.015 inches. Forming air for meltblowing the polypropylene was supplied to the air gaps at a temperature of about 600 degrees Fahrenheit and at a pressure of about 4 pounds per square inch, gage. The meltblown polypropylene microfibers thus formed were meltblown directly onto the upper surface of the fibrous nonwoven elastic web which was located approximately sixteen inches from the die tip. Because of these processing conditions the viscosity of the polypropylene was about 20 poise and very fine diameter polypropylene microfibers were formed on the surface of the fibrous nonwoven elastic web.

Next, the tensioning, biasing force was reduced so as to allow the fibrous nonwoven elastic web to retract and for the meltblown polypropylene web to be gathered in the machine direction. The composite nonwoven elastic web which was formed had inter-layer integrity which, apparently, resulted from the entanglement of the individual fibers of the two webs with each other since the webs were not otherwise joined by adhesives or heat-bonding.

Samples of the fibrous nonwoven elastic web, itself, and samples of the composite nonwoven elastic web were then stretched by an Instron tensile tester model 1122 which elongated each sample 100 percent, that is twice its unstretched length, and then allowed the sample to return to an unstretched condition. This procedure was then repeated three (3) times and then each sample was elongated to break. Each sample was two (2) inches wide by five (5) inches long and the initial jaw separation on the tester was set at one (1) inch. The samples were placed lengthwise in the tester and elongated at a rate of five (5) inches per minute. The machine direction data was obtained from samples having a machine direction length of five (5) inches and a transverse direction width of two (2) inches. The transverse or cross machine direction measurements were obtained from samples having a length of five (5) inches in the transverse machine direction and a width of two (2) inches in the machine direction. The data which was obtained for the fibrous nonwoven elastic web is tabulated in Table III below and the data which was obtained for the composite elastic web is tabulated in Table IV below.

TABLE III

FIBROUS NONWOVEN ELASTIC WEB

| Stretched | Stretch Number | Peak TEA* (Inch-Pounds) | Peak Load (Pounds) | Peak Elongation (Inches) |
|---|---|---|---|---|
| Machine Direction Measurement | | | | |
| 100% | #1 Avg** | 1.94 | .9744 | .9968 |
| | Std Dev*** | .40 | .197 | .0009 |
| 100% | #2 Avg | 1.38 | .9303 | .9870 |
| | Std Dev | .29 | .188 | .0006 |
| 100% | #3 Avg | 1.30 | .9074 | .9873 |
| | Std Dev | .28 | .181 | .0008 |
| 100% | #4 Avg | 1.24 | .8903 | .9873 |
| | Std Dev | .25 | .178 | .0005 |
| To break | #5 Avg | 10.08 | 1.4488 | 3.1394 |
| | Std Dev | 3.14 | .2982 | .5181 |
| Transverse Direction Measurements | | | | |
| 100% | #1 Avg** | 1.50 | .7811 | .9974 |
| | Std Dev*** | .12 | .0593 | .0017 |
| 100% | #2 Avg | 1.08 | .7459 | .9866 |
| | Std Dev | .08 | .0568 | .0009 |
| 100% | #3 Avg | 1.01 | .7261 | .9870 |
| | Std Dev | .07 | .0542 | .0007 |
| 100% | #4 Avg | .96 | .7107 | .9863 |
| | Std Dev | .07 | .0533 | .0008 |
| To break | #5 Avg | 10.41 | 1.295 | 3.644 |
| | Std Dev | 1.24 | .095 | .268 |

TABLE IV

COMPOSITE NONWOVEN ELASTIC WEB

| Stretched | Stretch Number | Peak TEA* (Inch-Pounds) | Peak Load (Pounds) | Peak Elongation (Inches) |
|---|---|---|---|---|
| Machine Direction Measurement | | | | |
| 100% | #1 Avg** | 2.04 | 1.2606 | .9976 |
| | Std Dev*** | .17 | .0793 | .0009 |
| 100% | #2 Avg | 1.37 | 1.2056 | .9866 |
| | Std Dev | .12 | .0810 | .0012 |
| 100% | #3 Avg | 1.29 | 1.1798 | .9874 |
| | Std Dev | .11 | .0773 | .0011 |
| 100% | #4 Avg | 1.24 | 1.161 | .9876 |
| | Std Dev | .11 | .0792 | .0012 |
| To break | #5 Avg | 9.65 | 2.5134 | 2.281 |
| | Std Dev | 1.87 | .1659 | .2243 |
| Transverse Direction Measurements | | | | |
| 100% | #1 Avg** | 2.28 | 1.277 | .9009 |
| | Std Dev*** | .48 | .1593 | .0900 |
| 100% | #2 Avg | .70 | 1.077 | .9853 |
| | Std Dev | .09 | .2206 | .0002 |
| 100% | #3 Avg | .58 | 1.022 | .9874 |
| | Std Dev | .08 | .2139 | .0013 |
| 100% | #4 Avg | .53 | .9846 | .9873 |
| | Std Dev | .08 | .2148 | .0012 |
| To break | #5 Avg**** | .88 | 1.159 | 1.0865 |
| | Std Dev | .21 | .2220 | .0120 |

Tables III and IV disclose the total energy absorbed, in inch-pounds, the peak (maximum) load, in pounds, encountered during each repetition and the amount of each peak (maximum) elongation, in inches in stretching the samples in each repetition of the 100 percent elongation procedure and in elongating the sample to break. It can be seen that the total energy required to stretch the sample 100 percent in the machine direction at the peak load encountered in such stretching is about the same for the fibrous nonwoven elastic web and the composite nonwoven elastic web. This is to be expected since the meltblown polypropylene web is gathered in the machine direction and generally requires little energy to be elongated in the machine direction. Upon elongation to break, the peak load for the composite nonwoven elastic web increased over 70 percent indicating that the meltblown polypropylene web was contributing strength to the strength of the composite nonwoven elastic web.

In the transverse machine direction (TD), where the meltblown polypropylene is not gathered, the peak load for the initial stretch of the composite nonwoven elastic web is over 60 percent greater than the peak load for the fibrous nonwoven elastic web. This indicates that the meltblown polypropylene web contributes to the strength of the composite nonwoven elastic web even at low elongations. Additionally, the peak total energy absorbed for the composite nonwoven elastic web represents a 50 percent increase over that of the fibrous nonwoven elastic web for the first stretch and then actually decreases on subsequent stretchings. This indicates that the meltblown polypropylene web was substantially ruptured (torn) during the first stretch and is no longer contributing to total energy of the composite web.

It was observed that the "breathability" of the composite nonwoven elastic web was still good as compared to the "breathability" of the fibrous nonwoven elastic web. Additionally, because of the thin web of meltblown polypropylene microfibers which have been applied to the surface of the fibrous nonwoven elastic web the composite web was more water repellent due to the water repellent characteristics of polypropylene. Moreover, application of the thin web of meltblown microfibers to the surface of the meltblown nonwoven elastic web changed the rubbery feel of the fibrous nonwoven elastic web to a soft, desirable feeling.

EXAMPLE II

A fibrous nonwoven web which had previously been formed by meltblowing a blend of sixty percent (60%), by weight, of an A-B-A' block copolymer having polystyrene "A" and "A'" endblocks and a poly (ethylene-butylene) "B" midblock (obtained from the Shell Chemical Company under the trade designation KRATON GX 1657) and forty percent (40%) by weight, of a polyethylene (obtained from U.S.I. under the trade designation PE Na 601) was provided in rolled-up form.

The prior meltblowing of the fibrous nonwoven elastic web was accomplished by extruding the blend of materials through a meltblowing die having thirty extrusion capillaries per lineal inch of die tip. The capillaries had a diameter of about 0.0145 inches and a length of about 0.113 inches. The blend was extruded through the capillaries at a rate of about 0.50 grams per capillary per minute at a temperature of about 570 degrees Fahrenheit. The extrusion pressure exerted upon the blend was measured as 144 pounds per square inch, gage in the capillaries. However, it is presently believed that this measurement was inaccurate due to a faulty pressure probe. The die tip configuration was adjusted so that it was recessed about 0.110 inches inwardly from the plane of the external surface of the air plates which form the forming air gaps on either side of the capillaries. The air plates were adjusted so that the two forming air gaps, one on each side of the extrusion capillaries, formed gaps of about 0.110 inches. Forming air for meltblowing the blend was supplied to the air gaps at a temperature of about 614 degrees Fahrenheit and at a pressure of about 4 pounds per square inch, gage. The meltblown microfibers were formed onto a forming screen which is believed to have been about 16 inches from the die tip. However, measurement of this distance was not actually taken.

Later, the thus formed fibrous nonwoven elastic web was unrolled and stretched by applying a tensioning, i.e. biasing, force in the machine direction (MD) and a fibrous nonwoven gatherable web was formed on the surface of the elastic web by meltblowing polypropylene (obtained from the Himot Company under the trade designation PF 301) as microfibers on to the upper surface of the fibrous nonwoven elastic web while the fibrous nonwoven elastic web was maintained at its stretched length.

Meltblowing of the fibrous nonwoven polypropylene gatherable web was accomplished by extruding the polypropylene through a meltblowing die having thirty extrusion capillaries per lineal inch of die tip. The capillaries each had a diameter of about 0.0145 inches and a length of about 0.113 inches. The polypropylene was extruded through the capillaries at a rate of about 0.75 grams per capillary per minute at a temperature of about 590 degrees Fahrenheit. The extrusion pressure exerted upon the polypropylene was measured as about 186 pounds per square inch, gage in the capillaries. The die tip configuration was adjusted so that it extended about 0.010 inches beyond the plane of the external surface of the air plates which form the forming air gaps on either side of the capillaries. The air plates were adjusted so that the two forming air gaps, one on each side of the extrusion capillaries, formed air gaps of about 0.018 inches. Forming air for meltblowing the polypropylene was supplied to the air gaps at a temperature of about 600 degrees Fahrenheit and at a pressure of about 2 pounds per square inch, gage. The distance between the die tip and the surface of the fibrous nonwoven elastic web upon which the gatherable polypropylene web was formed was about 10 inches. Because of these processing conditions, the viscosity of the polypropylene was about 124 poise and larger diameter meltblown polypropylene microfibers were formed on the surface of the stretched fibrous nonwoven elastic web.

Next, the tensioning, biasing force was reduced so as to allow the fibrous nonwoven elastic web to contract and for the meltblown polypropylene web to be gathered in the machine direction. The composite nonwoven elastic web which was formed had inter-layer integrity which, apparently, resulted from the entanglement of the individual fibers of the two webs with each other since the webs were not otherwise joined by adhesives or heat-bonding.

Samples of this fibrous nonwoven elastic web, itself, and samples of the composite nonwoven elastic web were then stretched by an Instron tensile tester model 1122 which elongated each sample 100 percent, that is to twice its unstretched length, and then allowed the sample to return to an unstretched condition. This procedure was then repeated three (3) times and then each sample was elongated to break. Each sample was two (2) inches wide by five (5) inches long and the initial jaw separation on the tester was set at one (1) inch. The samples were placed lengthwise in the tester and elongated at a rate of five (5) inches per minute. The machine direction data was obtained from samples having a machine direction length of five (5) inches and a transverse direction width of two (2) inches. The transverse or cross machine direction measurements were obtained from samples having a length of five (5) inches in the transverse direction and a width of two (2) inches in the machine direction. The data which was obtained for the composite nonwoven elastic web formed by example 2 is tabulated in Table V below.

Table V, below, illustrates that the, 100 percent, elongations required little energy or load in the machine direction while the total energy absorbed increased about seven (7) times and the peak load increased about three (3) times when the composite was stretched to break in the machine direction. In the transverse direction, where the meltblown was not gathered, the initial, 100 percent elongation absorbed about three and one half (3.5) times as much total energy as the total energy absorbed to break and about four (4) to five (5) times as much energy as any of the subsequent, 100 percent stretchings. Further, the peak load for the first stretching in the transverse direction was about 40 percent higher than the peak load for any subsequent stretching in the transverse direction, including stretching to break.

TABLE V
COMPOSITE NONWOVEN ELASTIC WEB

| Stretched | Stretch Number | Peak TEA* (Inch-Pounds) | Peak Load (Pounds) | Peak Elongation (Inches) |
|---|---|---|---|---|
| Machine Direction Measurement | | | | |
| 100% | #1 Avg** | .95 | .7708 | .9978 |
|  | Std Dev*** | .28 | .1742 | .0016 |
| 100% | #2 Avg | .75 | .7388 | .9870 |
|  | Std Dev | .23 | .1675 | .0015 |
| 100% | #3 Avg | .71 | .7204 | .9864 |
|  | Std Dev | .22 | .1636 | .0010 |
| 100% | #4 Avg | .68 | .7083 | .9860 |
|  | Std Dev | .22 | .1631 | .0011 |
| At break | #5 Avg | 5.75 | 1.974 | 2.023 |
|  | Std Dev | 1.36 | .2437 | .2037 |
| Transverse Direction Measurements | | | | |
| 100% | #1 Avg** | 3.08 | 2.042 | .7529 |
|  | Std Dev*** | .77 | .2333 | .0913 |
| 100% | #2 Avg | .83 | 1.422 | .9876 |
|  | Std Dev | .08 | .3076 | .0010 |
| 100% | #3 Avg | .72 | 1.3403 | .9870 |
|  | Std Dev | .08 | .2905 | .0009 |
| 100% | #4 Avg | .65 | 1.281 | .9878 |
|  | Std Dev | .07 | .2740 | .0012 |
| At break | #5 Avg | .85 | 1.322 | 1.052 |
|  | Std Dev | .07 | .2500 | .0446 |

Notes for Tables III, IV and V
*=Total Energy Absorbed
**=Average
***=Standard Deviation
****=Average of two measurements. The third measurement obtained values of 2.376 for Peak TEA, 1.232 for Peak Load and 5.609 Peak Elongation. These values are believed to be incorrect since they are so abberant from the other values obtained by the other two measurements.

Unless otherwise specifically noted the data reported in tables III, IV and V (above) represent an average value which was obtained by taking five (5) individual measurements for each machine direction measurement and three (3) individual measurements for each transverse direction measurement.

The basis weight of the meltblown fibrous nonwoven elastic web utilized for example I was 67.3 grams per square meter and the basis weight of the meltblown gatherable polypropylene web which was formed on the surface of the fibrous nonwoven elastic web of example I was measured as being 12.2 grams per square meter. The degree of relaxation or contraction of the composite nonwoven elastic web of example I was about 54 percent. This degree of relaxation of the composite was determined by taking a sample of the composite having a relaxed length of about 4.0 inches in the machine direction and elongating the sample, in the machine direction, until resistance to the elongation by the gathered polypropylene web was encountered. That is, just until the gathers in the polypropylene web were removed. At this point the 4.0 inch sample had been stretched to about 8.75 inches in the machine direction.

The basis weight of the fibrous nonwoven elastic web utilized in example II was about 66.2 grams per square meter and the basis weight of the fibrous nonwoven gatherable polypropylene web meltblown onto the surface of the elastic web in example II was measured at about 21.4 grams per square meter. The degree of relaxation or contracting of the composite nonwoven elastic web of example II was determined to be about 42 percent. This degree of relaxation was determined by taking a sample of the composite having a relaxed length of about 12 inches in the machine direction and elongating the sample, in the machine direction, until resistance to the elongation by the gathered polypropylene web was encountered. That is, just until the gathers in the polypropylene web were removed. At this point the 12 inch sample had been stretched to about 20.7 inches.

Upon observation of the relaxed, contracted composite nonwoven elastic web it was seen that the meltblown polypropylene web presented a creped, gathered, appearance with the lines of creeping or gathering being generally transverse to the direction in which the fibrous nonwoven elastic web was stretched during formation of the meltblown polypropylene web on the surface of the fibrous nonwoven elastic web (i.e. transverse to the maching direction). Interestingly, it was also observed that the fibrous nonwoven elastic web of the contracted and relaxed composite nonwoven elastic web exhibited lines of creping or gathering which were generally parallel to the direction of stretching of the fibrous nonwoven elastic web during formation of the meltblown polypropylene included on the surface thereof (i.e. the lines of creping or gathering of the fibrous nonwoven elastic web were generally parallel to the machine direction). Accordingly, the two webbed composite included webs having transposed lines of gathering or creping which generally crossed each other generally at right angles. Formation of the lines of gathering or creping in the fibrous nonwoven gatherable polypropylene web would be expected in view of the gathering of that web in the machine direction. However, formation of lines of gathering or creping in the fibrous nonwoven elastic web and, in particular, formation of lines of gathering or creping in the fibrous nonwoven elastic which are generally at right angles with the lines gathering or creping of the fibrous nonwoven gatherable polypropylene webs was unexpected.

Another interesting aspect of the present invention was revealed during testing of the samples and, in particular, during testing of the fibrous nonwoven meltblown gatherable polypropylene web to determine the basis weight of that web. In particular, after the fibrous nonwoven meltblown gatherable polypropylene web had been separated from the fibrous nonwoven elastic web, in order to determine the basis weight of the fibrous nonwoven meltblown polypropylene web, it was observed that the fibrous nonwoven meltblown polypropylene web retained its creped or gathered configuration. Moreover, the gatherable polypropylene web could be elongated in the machine direction upon application of a tensioning and biasing force in the machine direction and would, upon removal of the tensioning and biasing force, return substantially to it original relaxed and unbiased and untensioned dimension.

Other variations of the present inventive process and the product formed by the process are possible. For example, two or more fibrous nonwoven gatherable webs 50 could be bonded one on top of another in stacked configuration to give the fibrous nonwoven gatherable web 50 additional thickness. Additionally, a fibrous nonwoven gatherable web 50 could be bonded to both surfaces of the fibrous nonwoven elastic web 22 to form a composite nonwoven elastic web having the following three web sequence: fibrous nonwoven gatherable web/fibrous nonwoven elastic web/fibrous nonwoven gatherable web.

This three web sequence where the fibrous nonwoven elastic web is sandwiched between two fibrous nonwoven gatherable webs is especially preferred where the fibrous nonwoven elastic web 22 is formed from a tacky elastomeric material as described above because sandwiching of the tacky elastic web 22 between the two webs prevents the tacky web 22 from adhering to other portions of the web 52 upon rolling-up of the web 52 for storage. This three web material could be formed by the process which is illustrated schematically in FIG. 2. This process is identical to the process schematically illustrated in FIG. 1 until the two layered composite nonwoven elastic web 52 exits rollers 40 and 42. Thereafter, instead of proceding to the nip or gap 54 between the roller 56 and 58, the composite web 52 passes through the nip or gap 62 between a rotating roller 64 and a rotating nip roller 66. The composite web 52 is then carried by a third porous collecting screen 68 to the nip or gap 70 between a rotating nip roller 72 and a rotating roller 74. The porous collecting screen 68 moves about and is driven by the rollers 64 and 74 in the direction indicated by the arrows 69 in FIG. 2. Rotation of the rollers 64, 66, 72 and 74 is adjusted so that the peripheral surface speed of the rollers 64, 66, 72 and 74 is the same as the peripheral surface speed of the rollers 40 and 44. Accordingly, the fibrous nonwoven elastic web 22 is maintained at its stretched, biased length as it is carried by the porous collecting screen 68.

Figure 2:
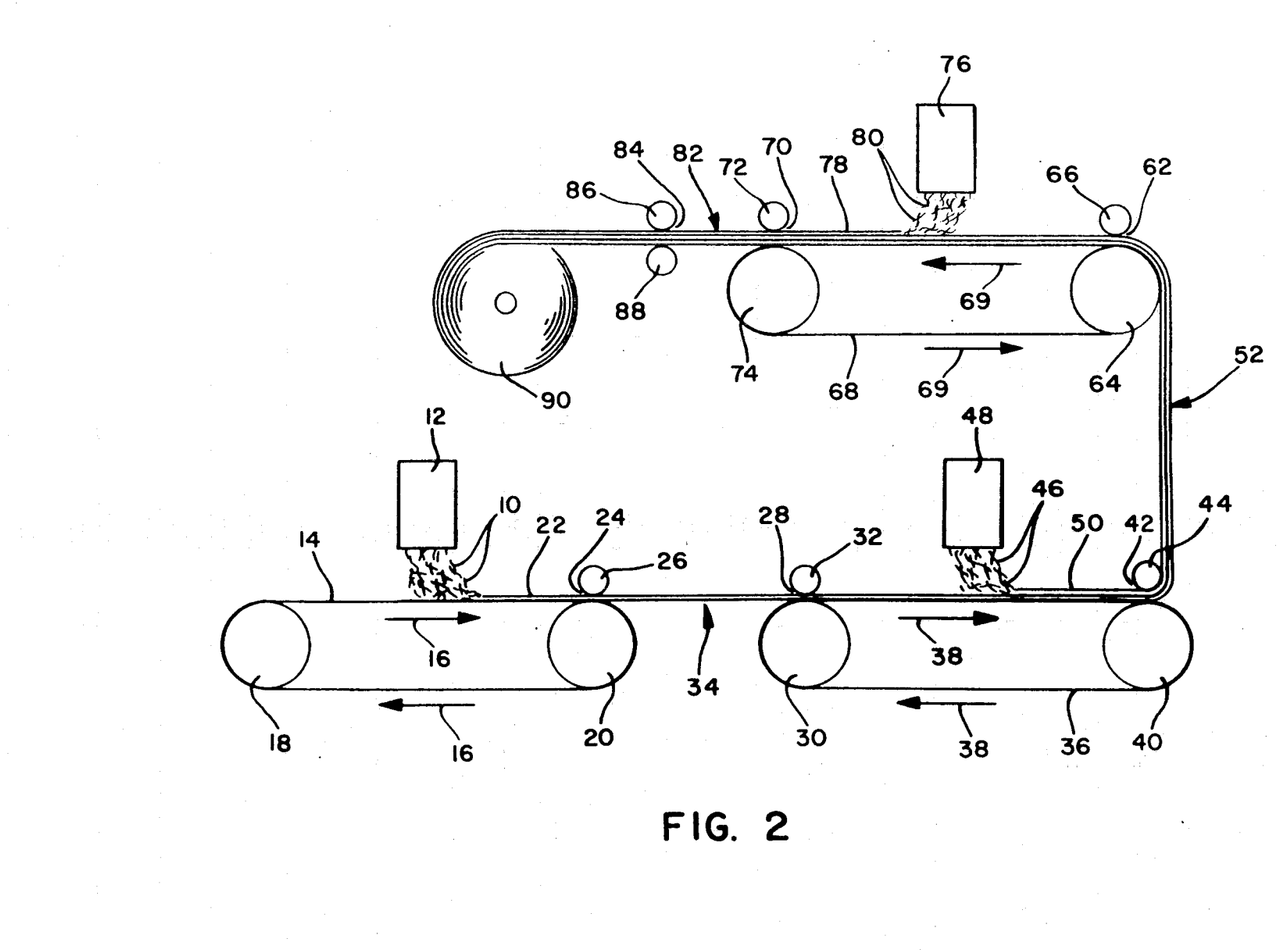
FIG. 2 is a schematic view illustrating another mode for carrying out the method of the present invention.

While the composite nonwoven elastic web 52 is being carried by the porous collecting screen 68, a conventional meltblowing die 26 (if desired, a conventional spunbonding die or carding apparatus can be utilized) forms a second nonwoven gatherable web 78 on the other surface of the stretched fibrous nonwoven elastic web 22 by meltblowing microfibers 80 directly onto the stretched upper surface of the nonwoven elastic web 22.

The materials which may be utilized to form the second gatherable web 78 may include any of the materials which were stated above as being utilizable to form the first fibrous nonwoven gatherable web 50. Particulate materials may also be incorporated within the web 78 as was stated above with regard to the webs 22 and 50. Thereafter, the second fibrous nonwoven gatherable web 78 may be heat-bonded to the fibrous nonwoven elastic web 22 by the action of rollers 72, 74 which are essentially equivalent to rollers 40, 44. The heat-bonding of the second fibrous nonwoven gatherable web 78 to the fibrous nonwoven elastic web 22 can be carried out within the same temperature ranges and within the same pressure ranges as were stated above with regard to the heat-bonding of the first fibrous nonwoven gatherable web 50 to the fibrous nonwoven elastic web 22. If desired, conventional sonic bonding techniques (not shown) maybe substituted for the heat-bonding step. Alternatively, if the fibrous nonwoven elastic web 22 is tacky, as described above, heat bonding of the fibrous nonwoven gatherable web 78 to the fibrous nonwoven elastic web will not be required since the second fibrous nonwoven gatherable web 78 will be simultaneously formed upon and joined to the surface of the fibrous nonwoven elastic web 22.

In another embodiment the second fibrous nonwoven gatherable web 78 may be joined to the surface of the fibrous nonwoven elastic web 22 by entanglement of the individual fibers of the web 78 with the individual fibers of the web 22 during formation of the web 78 on the surface of the web 22. In this embodiment the fibrous nonwoven gatherable web 78 is simultaneously formed upon and joined to the fibrous nonwoven elastic web 22. In any of these embodiments improved joining of the webs 50 and 78 to the web 22 can be effected by application of a coating of an adhesive material to the surface of the elastic web 22 prior to formation of the webs 50 and 78 upon the stretched surface of the web 22. Application of such an adhesive coating to the surface of web 22 may be conventionally readily effected by the nip rollers 32 and 66. For example, the adhesive material could be conventionally applied to the surface of the rollers 32 and 66 so that the rollers 32 and 66 would transfer the adhesive onto the surface of the web 22 as the web 22 passes through the nips 28 and 62. Alternatively, the adhesive may be applied onto the surface of the web 22 in a configuration of spots.

After joining of the gatherable web 78 to the elastic web 22 has been achieved, the biasing force on the web 22 is relaxed by passing the three webbed composite 82 through the nip or gap 84 between two rotating nip rollers 86 and 88. Rotation of the rollers 86 and 88 is adjusted so that the peripheral surface speed of the rollers 86 and 88 allows the composite web 82 to relax and, as a result of its elastic properties, to contract to its relaxed, unbiased length. The relaxing and contracting of the web 82 to its relaxed, unbiased length results in both of the fibrous nonwoven gatherable webs 50 and 78 being gathered by the relaxing and contracting of the fibrous nonwoven elastic web 22. Lastly, the composite web 82 can be rolled up and stored as is illustrated at 90. Since the tacky elastic web 22 is sandwiched between the webs 50 and 78 it will not adhere to other portions of the composite web 82 during storage. This material may be utilized to form a variety of products, such as, for example, diaper products.

It should be recognized that the three webbed composite 82 discussed above with respect to a tacky nonwoven elastic web 22 could be formed without using a tacky material to form the web 22. In this case, the other methods of joining, for example, fibrous entanglement, heat-bonding or sonic bonding, the web 78 to the web 22 would have to be utilized.

Another variation of the present invention would involve gathering of one or more of the gatherable webs 50 and 78 in the transverse machine direction (TD) as opposed to the machine direction (MD) as illustrated in the figures. If gathering of the gatherable webs 50 and/or 78 in the transverse machine direction (TD) is desired, additional conventional arrangements (not shown) for stretching and allowing contraction of the elastic web 22 in the transverse direction would replace the arrangement illustrated in the figures for extending and contracting the elastic web 22 in the machine direction (MD).

While the specific examples discussed herein have usually stated that the fibrous nonwoven gatherable webs 50 and 78 were formed by utilization of a conventional meltblowing die and meltblowing processes, conventional spunbonding dies and spunbonding processes may be substituted for the meltblowing dies and processes and the scope of the present invention is intended to include materials formed by the substitution of spunbonding dies and processes or any other apparatus and process for forming a nonwoven gatherable web for the meltblowing dies and processes 48 and 76. In the event that spunbonding dies and processes were substituted for either or both of the meltblowing dies or processes 48 and 76 joining of the gatherable web(s) 50 and, if applicable 78, to the fibrous nonwoven elastic web 22 should be effected, as stated above, by inter-web adhesion (if a tacky elastomeric material is utilized to form the web 22), by heat-bonding or sonic bonding and/or by application of an adhesive to the surface(s) of the web 22 prior to formation of the web(s) 50 and 78 thereon. These methods of joining should be utilized with spunbonded gatherable web since the fibers of spunbonded gatherable webs do not readily entangle with the fibers of the web 22. If the joining of one or more of the webs 50 and 78 to the web 22 is to be effected by heat-bonding (whether the webs 50 and 78 are spun bonded, meltblown or formed by other processes) care should be taken to allow the web 22 to relax and contract to substantially an untensioned, unbiased condition or configuration as soon as is practical after the heat-bonding step has occurred because it is believed that the nonwoven elastic web 22 will lose its elasticity if it is maintained above its softening for any significant period of time. This loss of elasticity may result from the cooling elastic web 22 "setting" while in the stretched configuration if it is maintained in the stretched configuration for a significant period of time after heat-bonding.

This case is one of a group of cases which are being filed on the same date. The group includes application Ser. No. 760,449 in the name of M. T. Morman and entitled Composite Nonwoven Elastic Web; application Ser. No. 760,445 in the name of M. T. Morman entitled Gathered Fibrous Nonwoven Web; application Ser. No. 760,698 in the name of M. T. Morman and T. J. Wisneski entitled Polyolefin-Containing Extrudable Compositions and Methods For Their Formation Into Elastomeric Products; application Ser. No. 760,438 in the name of M. T. Morman and T. J. Wisneski entitled Elasticizied Garment and Method Of Making The Same; application Ser. No. 760,366 in the name of M. T. Morman and T. J. Wisneski entitled High Temperature Method of Making Elastomeric Materials and Materials Obtained Thereby, application Ser. No. 760,437 in the name of M. J. Vander Wielen and J. D. Taylor entitled Composite Elsatomeric Material and Process for Making The Same and application Ser. No. 760,691 in the name of W. B. Haffner, M. T. Morman and T. J. Wisneski entitled Block Copolymer-Polyolefin Elastomeric Films. The subject matter of all of these applications is hereby incorporated by reference.

It is to be understood that variations and modifications of the present invention may be made without departing from the scope of the invention. It is also to be understood that the scope of the present invention is not to be interpreted as limited to the specific embodiments disclosed herein, but only in accordance with the appended claims when read in light of the foregoing disclosure.

What is claimed is:

1. A process for producing a composite nonwoven elastic web comprising a nonwoven elastic web joined to a fibrous nonwoven gathered web, said process comprising the steps of:
   providing a nonwoven elastic web;
   stretching said nonwoven elastic web;
   forming a fibrous nonwoven gatherable web directly upon a surface of the stretched nonwoven elastic web;
   joining the fibrous nonwoven gatherable web to the stretched nonwoven elastic web so as to form a composite nonwoven elastic web; and
   relaxing the composite elastic web to gather the fibrous nonwoven gatherable web.

2. The process according to claim 1, wherein the step of providing said nonwoven elastic web comprises forming a fibrous nonwoven elastic web of meltblown microfibers.

3. The process according to claim 1, wherein the step of providing said nonwoven elastic web comprises providing an apertured elastic film.

4. The process according to claim 2, wherein the fibrous nonwoven elastic web is stretched to at least about 125 percent of a relaxed length of the fibrous nonwoven elastic web.

5. The process according to claim 4, wherein the fibrous nonwoven elastic web is stretched from at least about 125 percent of the relaxed length of the fibrous nonwoven web to about 700 percent of the relaxed length of the nonwoven elastic web.

6. The process according to claim 1, wherein the step of forming said fibrous nonwoven gatherable web comprises forming a fibrous nonwoven gatherable web of meltblown microfibers.

7. The process according to claim 1, wherein the step of forming said fibrous nonwoven gatherable web comprises forming a fibrous nonwoven gatherable web of spunbonded microfibers.

8. The process according to claim 1, wherein the step of forming said fibrous nonwoven gatherable web comprises forming a carded web.

9. The process according to claim 1, wherein the step of joining the fibrous nonwoven gatherable web to the nonwoven elastic web is achieved by heat-bonding.

10. The process according to claim 9, wherein the step of heat-bonding the fibrous nonwoven gatherable web to said nonwoven elastic web is achieved by heat-bonding within the temperature range of from about 50 degrees centigrade below a melting temperature of a material utilized to form either of the webs to about the melting temperature of a material utilized to form either of the webs.

11. A composite nonwoven elastic web formed by the process according to claim 1.

12. The composite nonwoven elastic web formed by the process according to claim 11, wherein the nonwoven elastic web comprises elastomeric fibers formed from a material selected from the group consisting essentially of A-B-A' block copolymers, where A and A' are each a thermoplastic polymer endblock comprising a styrenic moiety and where A may be the same thermoplastic endblock as A' and where B is an elastomeric polymer midblock selected from the group consisting of poly(ethylene-butylene), polyisoprene or polybutadiene.

13. A composite nonwoven elastic web formed by the process according to claim 11, wherein the nonwoven elastic web comprises elastomeric fibers formed from a material selected from the group consisting essentially of blends of one or more polyolefins with S-EB-S block copolymers, where "S" is selected from the group consisting of polystyrene and polystyrene homologs and "EB" is poly(ethylene-butylene).

14. The composite nonwoven elastic web formed by the process according to claim 11, wherein the nonwoven elastic web comprises elastomeric fibers formed from a material consisting essentially of blends of poly-(alpha-methyl styrene) with S-I-S block copolymers, where "S" is selected from the group consisting of polystyrene and polystyrene homologs and "I" is polyisoprene.

15. The composite nonwoven elastic web according to claim 13, wherein the polyolefin is selected from the group consisting of at least one polymer, including copolymers, selected from the group consisting of ethylene, propylene and butene.

16. The composite nonwoven elastic web according to claim 13, where the polyolefin is poyethylene.

17. A composite nonwoven elastic web formed by the process according to claim 2.

18. The composite nonwoven elastic web formed by the process according to claim 17, wherein the fibrous nonwoven elastic web comprises meltblown elastomeric microfibers formed from a material selected from the group consisting essentially of A-B-A' block copolymers where "A" and "A'" are each a thermoplastic polymer endblock containing a hstyrenic moiety and where "A" may be the same thermoplastic block as "A'" and where "B" is an elastomeric polymer midblock selected from the group consisting of poly(ethylene-butylene), polyisoprene or polybutadiene.

19. The composite nonwoven elastic web formed by the process according to claim 17, wherein the nowoven elastic web comprises elastomeric microfibers formed from a material selected from the group consisting essentially of blends of one or more polyolefins with S-EB-S block copolymers, where "S" is selected from the group consisting of polystyrene and polystyrene homologs and "EB" is poly(ethylene-butylene).

20. The composite nonwoven elastic web formed by the process according to claim 17, wherein the nonwoven elastic web comprises elastomeric microfibers formed from a material consisting essentially of blends of poly(alpha-methyl styrene) with S-I-S block copolymers, where "S" is selected from the group consisting of polystyrene and polystyrene homologs and "I" is polyisoprene.

21. The composite nonwoven elastic web according to claim 19, wherein the polyolefin is selected from the group consisting of at least one polymer, including copolymers, selected from the group consisting of ethylene, propylene, and butene.

22. The composite nonwoven elastic web according to claim 19, where the polyolefin is polyethylene.

23. The composite nonwoven elastic web according to claim 11, wherein the fibrous nonwoven gatherable web comprises nonelastic meltblown microfibers.

24. The composite nonwoven elastic web according to claim 23, wherein the fibrous nonwoven gatherable web comprises nonelastic meltblown microfibers selected from the group consisting of polyester microfibers, polyolefin microfibers or blends of one or more polyester microfibers with one or more polyolefin microfibers.

25. The composite nonwoven elastic web according to claim 24, wherein the polyester microfibers comprise polyethylene terephthalate microfibers.

26. The composite nonwoven elastic web according to claim 24, wherein the polyolefin microfibers comprising the fibrous nonwoven gatherable web comprise polypropylene microfibers.

27. The composite nonwoven elastic web according to claim 11, wherein the fibrous nonwoven gatherable web comprises nonelastic spunbonded microfibers.

28. The composite nonwoven elastic web according to claim 27, wherein the fibrous nonwoven gatherable web comprises nonelastic spunbonded microfibers selected from the group consisting of polyester microfibers, polyolefin microfibers or blends of one or more polyester microfibers with one or more polyolefin microfibers.

29. The composite nonwoven elastic web according to claim 28, wherein the polyester microfibers comprise polyethylene terephthalate microfibers.

30. The composite nonwoven elastic web according to claim 28, wherein the polyolefin microfibers comprising the fibrous nonwoven gathered web comprise polypropylene microfibers.

31. A process for producing a composite nonwoven elastic web comprising a nonwoven elastic web joined to a fibrous nonwoven gathered web, said process comprising the steps of:
providing a tacky nonwoven elastic web;
stretching the tacky nonwoven elastic web;
forming a composite nonwoven elastic web by forming a fibrous nonwoven gatherable web directly upon a surface of the stretched nonwoven elastic web and simultaneously joining said nonwoven gatherable web to the surface of the stretched nonwoven elastic web wherein joining of the tacky nonwoven elastic web to the fibrous nonwoven gatherable web is achieved by adhesion of the two webs to each other during formation of the fibrous nonwoven gatherable web on the surface of the stretched fibrous nonwoven elastic web; and
relaxing the tacky composite nonwoven elastic web to gather the fibrous nonwoven gatherable web.

32. The process according to claim 31, wherein the adhesion of the two webs to each other is improved by applying pressure to the joined webs.

33. The process according to claim 31, wherein the step of providing said tacky nonwoven elastic web comprises forming a fibrous nonwoven elastic web of meltblown microfibers.

34. A composite nonwoven elastic web formed by the process according to claim 33, wherein the tacky fibrous nonwoven elastic web comprises tacky meltblown elastomeric microfibers formed from a material selected from the group consisting essentially of (a) A-B-A' block copolymers, where "A" and "A'" are thermoplastic polymer endblocks selected from the group consisting of polystyrene or polystyrene homologs and where "B" is an elastomeric polymer midblock consisting of polyisoprene or (b) blends of poly(alpha-methylstyrene) with A-B-A' block copolymers, where "A" and "A'" are thermoplastic polymer endblocks selected from the group consisting of polystyrene or polystyrene homologs and B is an elastomeric polymer midblock consisting of polyisoprene.

35. The composite nonwoven elastic web according to claim 34, wherein A and A' are selected from the group consisting of polystyrene.

36. The process according to claim 33, wherein the step of forming said fibrous nonwoven gatherable web comprises forming a fibrous nonwoven gatherable web of meltblown microfibers on the surface of said fibrous nonwoven elastic web.

37. A composite nonwoven elastic web formed by the process according to claim 36, wherein the tacky fibrous nonwoven elastic web comprises tacky meltblown elastomeric microfibers formed from a material selected from the group consisting essentially of (a) A-B-A' block copolymers, where "A" and "A'" are thermoplastic polymer endblocks selected from the group consisting of polystyrene or polystyrene homologs and where "B" is an elastomeric polymer midblock consisting of polyisoprene or (b) blends of poly(alpha-methylstyrene) with A-B-A' block copolymers, where "A" and "A'" are thermoplastic polymer endblocks selected from the group consisting of polystyrene or polystyrene homologs and "B" is an elastomeric polymer midblock consisting of polyisoprene.

38. The composite nonwoven elastic web according to claim 35, wherein A and A' are polystyrene.

39. The process according to claim 33, wherein the step of forming said fibrous nonwoven gatherable web comprises forming a fibrous nonwoven gatherable web of spunbonded microfibers on the surface of said fibrous nonwoven elastic web.

40. A composite nonwoven elastic web formed by the process according to claim 39, wherein the tacky fibrous nonwoven elastic web comprises tacky meltblown elastomeric microfibers formed from a material selected from the group consisting essentially of (a) A-B-A' block copolymers, where "A" and "A'" are thermoplastic polymer endblocks selected from the group consisting of polystyrene or polystyrene homologs and where "B" is an elastomeric polymer midblock consisting of polyisoprene or (b) blends of poly(alpha-methylstyrene) with A-B-A' block copolymers, where "A" and "A'" are thermoplastic polymer endblocks selected from the group consisting of polystyrene or polystyrene homologs and "B" is an elastomeric polymer midblock consisting of polyisoprene.

41. The composite nonwoven elastic web according to claim 40, wherein A and A' are polystyrene.

42. A process for producing a composite nonwoven elastic web comprising a nonwoven elastic web joined to a fibrous nonwoven gathered web, said process comprising the steps of:
providing a nonwoven elastic web;
stretching said nonwoven elastic web;
forming a composite nonwoven elastic web by forming a fibrous nonwoven gatherable web directly upon a surface of the stretched nonwoven elastic web and simultaneously joining the fibrous nonwoven gatherable web to the surface of the stretched nonwoven elastic web wherein joining of the nonwoven elastic web to the fibrous nonwoven gatherable web is achieved by entanglement of the individual fibers of the nonwoven gatherable web with the nonwoven elastic web during formation of the fibrous nonwoven gatherable web on the surface of the stretched nonwoven elastic web; and
relaxing the composite nonwoven elastic web or gather the fibrous nonwoven gatherable web.

43. The process according to claim 42, wherein the step of providing said nonwoven elastic web comprises forming a fibrous nonwoven elastic web of meltblown microfibers.

44. The process according to claim 43, wherein said joining is achieved solely by entanglement of the individual fibers of the fibrous nonwoven gatherable web with the individual fibers of the fibrous nonwoven elastic web of meltblown microfibers.

45. The process according to claim 42, wherein the step of providing said nonwoven elastic web comprises providing an apertured nonwoven elastic film.

46. The process according to claim 45, wherein said joining is achieved solely by entanglement of the individual fibers of the fibrous nonwoven gatherable web with the apertures of the apertured nonwoven elastic film.

* * * * *